(12) United States Patent
Oyama

(10) Patent No.: US 6,509,122 B1
(45) Date of Patent: Jan. 21, 2003

(54) POLYMER ELECTROLYTE

(76) Inventor: Noboru Oyama, 3-10-7, Kichijyojihigashi-cho, Musashino-shi, Tokyo (JP)

( * ) Notice: Subject to any disclaimer, the term of this patent is extended or adjusted under 35 U.S.C. 154(b) by 0 days.

(21) Appl. No.: 09/527,569

(22) Filed: Mar. 16, 2000

(30) Foreign Application Priority Data

Mar. 17, 1999 (JP) .............................. 11-071758
Oct. 18, 1999 (JP) .............................. 11-295503

(51) Int. Cl.[7] .............................. H01M 6/16; H01M 6/18
(52) U.S. Cl. .................. 429/303; 429/304; 429/336; 429/338; 429/339; 429/341
(58) Field of Search ................. 429/303, 336, 429/338, 341, 339, 304

(56) References Cited

U.S. PATENT DOCUMENTS 5,972,539 A * 10/1999 Hasegawa et al. .......... 429/304
6,001,509 A * 12/1999 Kim et al. .................. 429/309

OTHER PUBLICATIONS

Morita et al. "New polymeric gel electrolytes consisting of oligo(ethylene oxide)–grafted polymethacrylate matrices for rechargeable lithium batteries" Solid State Ionics 113–115 (1998), pp. 117–122.*

* cited by examiner

Primary Examiner—Carol Chaney
Assistant Examiner—Tracy Dove
(74) Attorney, Agent, or Firm—Oblon, Spivak, McClelland, Maier & Neustadt, P.C.

(57) ABSTRACT

A polymer electrolyte for lithium secondary batteries in which growth of lithium dendrites is suppressed is disclosed, batteries exhibiting excellent discharge characteristics in low to high temperature, comprising a polymer gel holding a nonaqueous solvent containing an electrolyte, wherein the polymer gel comprises (I) a unit derived from at least one monomer having one copolymerizable vinyl group and (II) a unit derived from at least one compound selected from the group consisting of (II-a) a compound having two acryloyl groups and a (poly)oxyethylene group, (II-b) a compound having one acryloyl group and a (poly)oxyethylene group, and (II-c) a glycidyl ether compound, particularly the polymer gel comprises monomer (I), compound (II-a), and a copolymerizable plasticizing compound are disclosed.

7 Claims, 11 Drawing Sheets

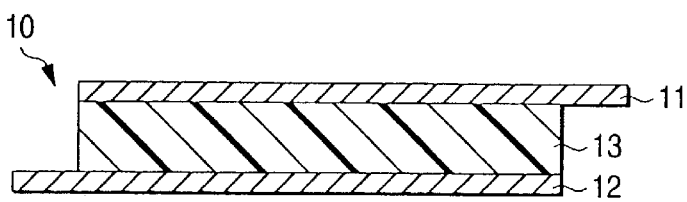
FIG. 1
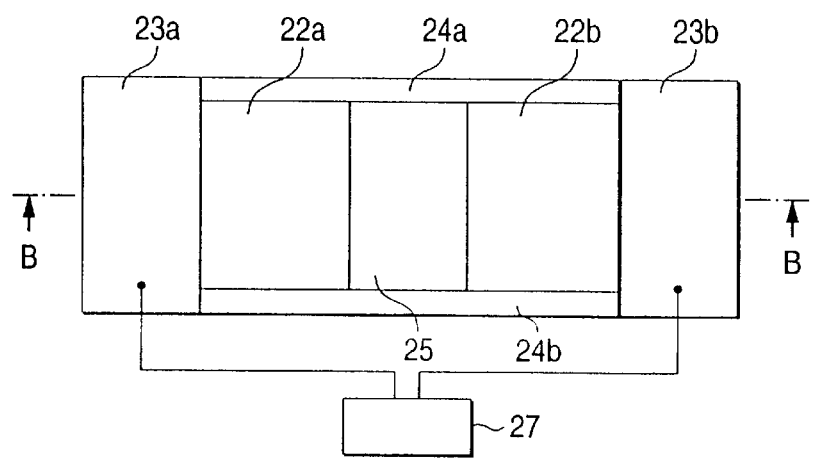
FIG. 2A
FIG. 2B
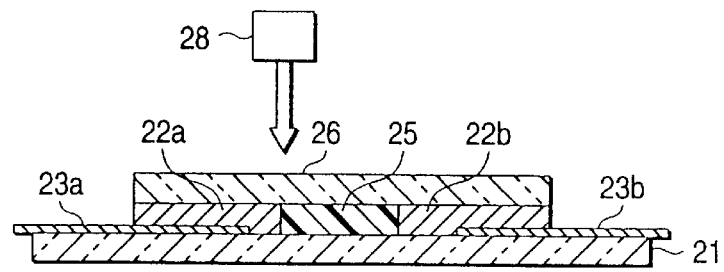
FIG. 3
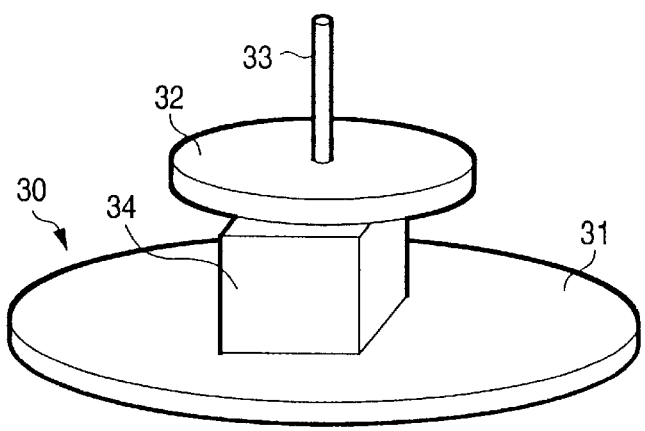

⊢——⊣
100 μm

⊢——⊣
100 μm

1000/T (MEASURING TEMPERATURE T: ABSOLUTE TEMPERATURE)

POLYMER ELECTROLYTE

FIELD OF THE INVENTION

This invention relates to a polymer electrolyte and more particularly a polymer electrolyte suited for use in lithium batteries.

BACKGROUND OF THE INVENTION

In recent years, lithium ion batteries have been put to practical use and enjoyed wide use in various electronic equipment. In particular, lithium secondary batteries using metallic lithium or a lithium alloy with other metals as a negative electrode are expected as promising secondary batteries having high energy density. However, the state-of-the-art lithium secondary batteries involve several problems that have hindered them from being put on the market. The biggest problem of our concerns waiting for solutions is how to prevent generation and growth of lithium dendrites during charging processes. The problem of dendrite formation also occurs in a negative electrode comprising a lithium-intercalated carbon material under the condition of a high rate.

Allowed to keep growing, lithium dendrites will reach the positive electrode of a battery to cause an internal short-circuit. In case an internal short-circuit should take place, a large current instantaneously passes through the dendrites, resulting in generation of temperature increase and pressure increase, which may lead to take a fire. Therefore, various means have been tried for preventing such an internal short-circuit. To prevent an internal short-circuit would extend the battery performance life and maintain the high value of charge and discharge efficiency. In JP-A-60-167280, for example, a rechargable electrochemical device in which formation of lithium dendrites is suppressed by using an alloy of lithium and other metals has been disclosed.

Use of an ion-conducting inorganic solid electrolyte, polymer electrolyte or solid polymer electrolyte, etc. for suppressing growth of lithium dendrites has also been under study. For example, Oyama et al. have reported that a polyacrylonitrile (PAN) gel electrolyte, in a concentration of 5% by weight or more based on a nonaqueous solvent, protects lithium surfaces from forming dendrites (New Energy and Industrial Technology Growth organization (NEDO) '96 Research Report (Mar., 1996))

It is expected for lithium batteries and capacitors which are to be developed to have not only an increased energy density but capability of rapidly working within limited charging and discharging times. In particular, growth of batteries which function sufficiently in low temperature (−20° C.) has been sought for.

In general, the performance of batteries and capacitors is, in nature of their working principle, limited by the ionic mobility and the distance of ions to be transferred. In the case of a battery, since it is impossible to appreciably increase the ionic mobility in the electrolyte and in the electrode active material, an approach to be taken is to shorten the distance of ions to be moved and to use a material having a large reactive area. In the case of a capacitor, too, increased mobility of carrier ions leads to considerable reduction of the charging and discharging times. Therefore, in order to improve capacitor performance, it is necessary to shorten the distance between electrodes and to widen the electrode area as with the case of batteries. To materialize the above approach, it is essential to prepare a very thin and yet mechanically strong electrolyte film.

Further, a secondary battery using metallic lithium as a negative electrode has also been demanded. As stated above, however, a battery having a negative electrode of metallic lithium and a liquid electrolyte suffers from growth of lithium dendrites on the interface between the negative electrode and the liquid electrolyte on repetition of charge and discharge cycles, which gives rise to deterioration of battery performance and the safety problem.

Polymers, when applied as battery materials, have advantages of lightness, flexibility, and capability of thin film formation and are therefore promising for providing a next generation of batteries. A polymer electrolyte comprising a polymer and an organic solvent containing an electrolyte is particularly sought for. However, a polymer gel is disadvantageous in that, for one thing, a reaction current is concentrated at part of the negative electrode surface because lithium ions are transported via the solution phase in the polymer matrix as is observed with a type of solution electrolyte and, as a result, lithium deposits locally to induce growth of lithium dendrites. For another thing, a polymer gel has weaker mechanical strength than a solid polymer.

Further, conventional solid or gel polymer electrolytes fail to function sufficiently in low temperature. In addition, a gel polymer has poor liquid retentive properties in high temperature.

SUMMARY OF THE INVENTION

Accordingly, an object of the invention is to provide a novel polymer electrolyte having high ionic conductivity.

Another object of the invention is to provide a polymer electrolyte which suppresses growth of lithium dendrites.

Still another object of the invention is to provide a polymer electrolyte which provides a battery exhibiting excellent discharge characteristics in low to high temperatures.

The present invention provides in its first aspect a polymer electrolyte comprising a polymer gel holding a non-aqueous solvent containing an electrolyte, wherein the polymer gel comprises (I) a unit derived from at least one monomer having one copolymerizable vinyl group and (II) a unit derived from at least one compound selected from the group consisting of (II-a) a compound having two acryloyl groups and a (poly)oxyethylene group, (II-b) a compound having one acryloyl group and a (poly)oxyethylene group, and (II-c) a glycidyl ether compound.

The invention also provides in its second aspect a polymer electrolyte comprising a polymer gel holding a nonaqueous solvent containing an electrolyte, wherein the polymer gel comprises (A) a unit derived from at least one monomer having one copolymerizable vinyl group, (B) a unit derived from a compound having two acryloyl groups and a (poly)oxyethylene group, and (C) a unit derived from a plasticizing compound having a polymerizable group.

The term "(poly)oxyethylene group" as used herein is intended to include both an oxyethylene group and a polyoxyethylene group.

The polymer electrolyte according to the invention suppresses growth of dendrites. In particular, the polymer electrolyte according to the second aspect exhibits excellent low-temperature characteristics.

The polymer gel constituting the matrix of the polymer electrolyte of the invention is preferably a polymer having an oxyethylene chain in which polymer chains derived from at least one monomer having a copolymerizable vinyl group are cross-linked with a cross-linking compound having two acryloyl groups and a (poly)oxyethylene group. The organic solvent supported by the polymer gel is prevented from leaking by controlling the cross-linking density and the length of the oxyethylene chain. The polymer gel of the invention exhibits sufficient mechanical strength for use as an electrolyte matrix.

Combined with a substance capable of intercalating and deintercalating lithium ions or metallic lithium as a negative electrode., the polymer electrolyte of the invention provides a high-performance lithium secondary battery which does not generate lithium dendrites or does not allow generated lithium dendrites to grow even during high rate charging. The polymer electrolyte of the invention holds a moderate amount of an electrolyte solution so that the hindrance of the polymer matrix to lithium ions migration is minimized. Because polymer chains cover the surface of the negative electrode to make the precipitation of lithium ions on the negative electrode surface uniform, lithium dendrites are hardly formed. If nuclei of dendrites generate, they are inhibited from growing by polymer networks.

BRIEF DESCRIPTION OF THE DRAWINGS

FIG. 1 is a schematic cross section showing the structure of a polymer battery;

FIG. 2 illustrates schematic plane and cross-sectional views of equipment for measuring the ionic conductivity of a polymer electrolyte and for observing dendrite growth;

FIG. 3 is a schematic view of a device for measuring the mechanical strength of a polymer electrolyte;

DETAILED DESCRIPTION OF THE INVENTION

Figure 4A:
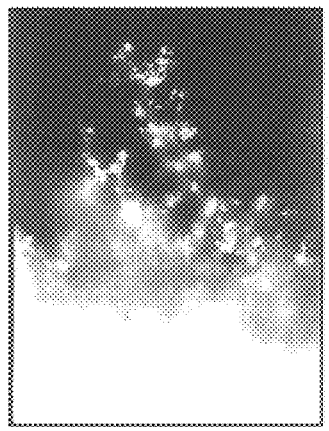
FIG. 4 shows micrographs of the interfaces between a lithium electrode and a polymer electrolyte prepared in Comparative Example 1 (FIG. 4A), Example 2 (FIG. 4B), and Example 1 (FIG. 4C), taken after constant current electrolysis at a current density of 1 mA/cm$^2$ for 1 hour.

The electrolyte, i.e., ion conducting material, which can be used in the polymer electrolyte of the invention is not particularly limited and can be selected appropriately from known materials. In the present invention, the electrolyte as dissolved in an nonaqueous solution (electrolyte solution) is held in the polymer matrix to form a gel electrolyte. The polymer gel that is the polymer matrix comprises oxyethylene chains and like compounds which are capable of interacting with lithium ions and transporting lithium ions while stably holding the electrolyte solution.

For example, the cross-linking compound having a poly (oxyethylene) group (—$(CH_2CH_2O)_n$—) offers a site of free volume for the interaction between —$(CH_2CH_2O)_n$— and Li$^+$ for the lithium ion movement. Further, in the polymer electrolyte of the invention the polymer chains are so compatible with the electrolyte solution that lithium ions interact with the poly(oxyethylene) groups or are solvated with solvent molecules.

It is known that a polyether forms a gentle helical structure, and lithium ions are incorporated in the helix (P. V. Wright, *Electrochimica Acta,* vol. 43, p. 1137 (1998)). Accordingly, in the polymer gel cross-linked by the above-described cross-linking compound lithium ions are solvated with steric stability. Also, the activation energy for the reduction of lithium ions varies. It is therefore expected that the following chemical reaction causing dendrite growth be suppressed.

An increase of ether oxygen promotes coordination of Li$^+$ to the oxygen to lithium ions and largely influences the transport of Li$^+$. Further, the polymer electrolyte of the invention is in close contact with the electrode surface in a lithium battery or a capacitor, which changes the solvation state of the ions in the electric double layer. The polymer gel (polymer matrix) in the vicinities of the electrode surface is influential on the physicochemical properties such as salvation, charge distribution and affinity for solvent. In general, reduced lithium reacts with a third substance, such as a solvent and a supporting salt, to form a new interface layer, on which dendrites are formed. In the present invention, growth of dendrites is prevented by the effect of the matrix.

Because the polymer electrolyte in the vicinities of the electrode surface has mechanical strength and viscoelasticity, it acts to impose pressure on a molecular level upon the dendrite forming reaction which selectively takes place in a specific site thereby to suppress local growth of dendrites. The polymer gel uniformly adheres to the surface of the negative electrode so that the reaction on that surface is levelled in terms of thermodynamics and chemical kinetics, which also seems to suppress local growth of dendrites.

The inventioned polymer gel having a poly(oxyethylene) group in its side chain has flexibility. This is because the bifunctional acryloyl group, e.g., diacrylate group, functions as a cross-linking agent. The number of cross-linking points (cross-linking density) of the polymer gel is of importance, being related to the leakage of the electrolyte solution out of the gel or the solvent holding therein. The cross-linking density has its optimum range. As the cross-linking density increases, prevention of the leakage is ensured but, on the other hand, crystallization of the polymer electrolyte is accelerated.

According to the second aspect of the invention, incorporation of a specific plasticizing compound (plasticizing monomer) provides a polymer electrolyte which sufficiently functions even in low temperature, e.g., around −20° C.

According to the first aspect of the invention, the polymer gel which constitutes the matrix of the polymer electrolyte comprises (I) a unit derived from at least one monomer having one copolymerizable vinyl group and (II) a unit derived from at least one compound selected from the group consisting of (II-a) a compound having two acryloyl groups and a (poly) oxyethylene group, (II-b) a compound having one acryloyl group and a (poly)oxyethylene group, and (II-c) a glycidyl ether compound. Compound (II-a) is particularly preferred among the compounds providing unit (II). That is, the polymer gel of the first aspect of the invention preferably comprises unit (I) derived from monomer (I) and unit (II) derived from compound (II-a).

Monomer (I) having a copolymerizable vinyl group usually contains no oxyethylene group. Such compounds include (meth)acrylonitrile (i.e., acrylonitrile and methacrylonitrile), (a-alkyl)acrylic acid (i.e., acrylic acid and an a-alkylacrylic acid, hereinafter the same), (α-alkyl) acrylic esters, fluoroalkyl(α-alkyl)acrylates, fluoroalkyl(α-fluoroalkyl)acrylates, vinyl esters (e.g., vinyl acetate), vinylalkyl ethers, allylalkyl ethers, allyl esters, vinyl alcohol, vinyl chloride, vinylidene chloride, and cyclic olefins. In the α-alkylacrylic acids or α-fluoroalkylacrylic acids, the alkyl group at the α-position includes methyl, ethyl, propyl, and butyl, with methyl being preferred.

The ester- or ether-forming alkyl group in the alkyl (α-alkyl)acrylates, vinyl alkyl ethers, and allyl alkyl ethers includes methyl, ethyl, n-propyl, isopropyl, n-butyl, isobutyl, sec-butyl, t-butyl, hexyl, heptyl, 2-heptyl, 2-ethylbutyl, n-decyl, dodecyl, tetradecyl, octadecyl, n-hexyl, 2-ethylhexyl, and n-octyl.

Specific examples of the fluoroalkyl esters of acrylic acid, an α-alkylacrylic acid or an α-fluoroalkylacrylic acid are trifluoroethylmethacrylate, tridecafluorooctanyl methacrylate, tetrafluoroethylmethacrylate, tetrafluoroacrylates, hexafluoroisopropyl methacrylate, hexafluoroisopropyl acrylate, hexafluorobutene-2 acrylate, hexafluorobutadiene-1,3 acrylate, hexafluoropropaneacrylate, propyl heptadecafluorodecylmethacrylate, and heptadecafluorodecanyl methacrylate.

Compound (II-a) having two acryloyl groups and a (poly) oxyethylene group acts to cross-link the polymer chains derived from monomer (I). Such a cross-linking compound can be represented by formula (1) or (2):

$$H_2C=C(R)COO(CH_2CH_2O)_n-COC(R)=CH_2 \quad (1)$$

wherein n represents an integer 1 to 23; R represents an alkyl group having 1 to 4 carbon atoms.

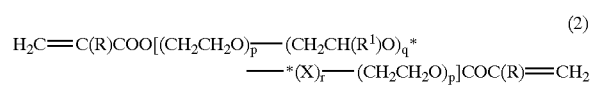

$$H_2C=C(R)COO[(CH_2CH_2O)_{\overline{p}}-(CH_2CH(R^1)O)_q*\\-*(X)_{\overline{r}}-(CH_2CH_2O)_p]COC(R)=CH_2 \quad (2)$$

wherein R represents an alkyl group having 1 to 4 carbon atoms; $R^1$ represents a hydrogen atom or a methyl group; X represents a bisphenol group; p represents an integer of 16 or smaller; q represents an integer of 34 or smaller; and r represents 0 or 1.

The compound represented by formula (1) includes (poly) oxyethylenedimethacrylates. For example, the compounds of formula (1) in which R is a methyl group are commercially available from Nippon Oil & Fats Co., Ltd. under trade names Blenmer PDE50 (n=1), Blenmer PDE100 (n=2), Blenmer PDE150 (n=3), Blenmer PDE200 (n=4), Blenmer PDE400 (n=9), Blenmer PDE600 (n=14) and Blenmer PDE1000 (n=23).

The compound represented by formula (2) includes polyalkylene glycol dimethacrylates. For example, the compounds of formula (2), in which R and $R^1$ are each a methyl group, and r is 0, are commercially supplied from Nippon Oil & Fats under trade names PLN-102P (p=3, q=17) and PLN-104P (p=8, q=17). The compounds of formula (2), wherein R and $R^1$ are each a methyl group, and r is 1, include bisphenol A-poly(ethyleneglycol propylene glycol) dimethacrylate, which are supplied from Nippon Oil & Fats under trade name Blenmer 43DB-40B (p=4, q=4).

The cross-linking compound (II-a) usually has a weight average molecular weight of 5000 or less.

Compound (II-b) having an acryloyl group and a (oligo) oxyethylene group can be represented by formula (3), (4) or (5):

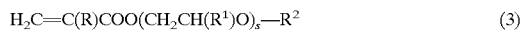

$$H_2C=C(R)COO(CH_2CH(R^1)O)_s-R^2 \quad (3)$$

wherein R represents a hydrogen atom or an alkyl group having 1 to 4 carbon atoms; $R^1$ and $R^2$ each represent a hydrogen atom or a methyl group; and s represents an integer of 1 to 100.

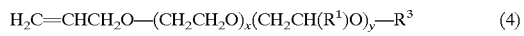

$$H_2C=CHCH_2O-(CH_2CH_2O)_x(CH_2CH(R^1)O)_y-R^3 \quad (4)$$

wherein $R^1$ represents a hydrogen atom or a methyl group; $R^3$ represents a hydrogen atom or an alkyl group (e.g., methyl, ethyl, propyl or butyl); and x and y represent mole percents in toto 100% in total, wherein x=100% and y=0%, or x≦50% and y≧50%.

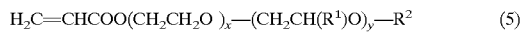

$$H_2C=CHCOO(CH_2CH_2O)_x-(CH_2CH(R^1)O)_y-R^2 \quad (5)$$

wherein $R^1$ and $R^2$ each represent a hydrogen atom or a methyl group; and x and y represent mole percents in toto 100%, wherein x=0% and y=100%, or x≧50% and y≦50%.

The compound represented by formula (3) includes:

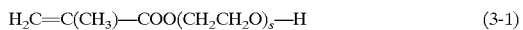  (3-1)

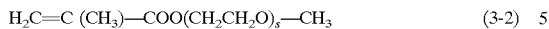  (3-2)

  (3-3)

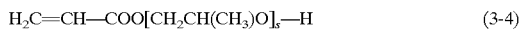  (3-4)

Compounds (3-1) are commercially available from Nippon Oil & Fats under trade names Blenmer E (s=1), Blenmer PE-90 (s=2), Blenmer PE-200 (s=4) and Blenmer PE-350 (s=8). Compounds (3-2) are commercially available from the same manufacturer under trade names Blenmer PME-50 (s=1), Blenmer PME-100 (s=2), Blenmer PME-150 (s=3), Blenmer PME-200 (s=4), Blenmer PME-400 (s=9) and Blenmer PME-4000 (s=98). Compounds (3-3) are commercially supplied from the same manufacturer under trade names Blenmer PP1000 (s=5), Blenmer PP500 (s=9), and Blenmer PP800 (s=12). Compounds (3-4) are supplied from the same manufacturer under trade names Blenmer AP-400 (s=6) and Blenmer AP-350 (s=7).

The compounds represented by formula (4) include:

  (4-1)

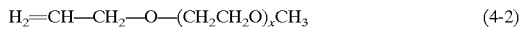  (4-2)

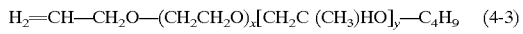  (4-3)

Compounds (4-1) are available from Nippon Oil & Fats under trade names Uniox PKA-5001 (mol. wt.: 200), Uniox PKA-5002 (mol. wt.: 400), Uniox PKA-5003 (mol. wt.: 450), Uniox PKA-5004 (mol. wt.: 450), and Uniox PKA-5005 (weight average mol. wt., hereinafter Mw: ca. 1500).

Compounds (4-2) are available from the same manufacturer under trade names Uniox PKA-5006 (mol. wt.: 350), Uniox PKA-5007 (Mw: 400), Uniox PKA-5008 (Mw: 450), Uniox PKA-5009 (MW: 550), and Uniox PKA-5010 (MW: ca. 1500).

Compounds (4-3) are available from the same manufacturer under trade names Unisafe PKA-15 (x/y: 25/75 by mole; Mw: ca. 1600), Unisafe PKA-16 (x/y: 50/50; Mw: ca. 1600), and Unisafe PKA-17 (x/y: 50/50; MW: ca. 2500).

The compounds represented by formula (5) include:

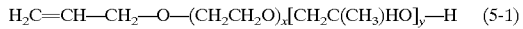  (5-1)

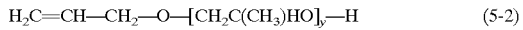  (5-2)

Compounds (5-1) are commercially available from Nippon Oil & Fats under trade names Unisafe PKA-11 (x/y: 75/25; Mw: ca. 750), Unisafe PKA-12 (x/y: 75/25; Mw: ca. 2000), and Unisafe PKA-13 (x/y: 50/50; Mw: ca. 2000). Compound (5-2) are commercially supplied from the same manufacturer, e.g., under trade name Unisafe PKA-14 (x/y: 50/50; Mw: 1500).

Compounds (II-b), particularly those represented by formula (4) or (5), usually have a weight average molecular weight of 5000 or smaller.

The glycidyl ether compound (II-c) which can be used in the polymer gel includes methylene glycidyl ether, ethyl glycidyl ether, and alkyl-, alkenyl-, aryl- or alkylaryl-polyethylene glycol glycidyl ethers represented by formula (6):

  (6)

wherein $R^4$ represents a straight-chain or branched alkyl or alkenyl group having 1 to 12 carbon atoms, an aryl group or an alkylaryl group; n represents an integer of 1 to 25, preferably 1 to 15.

In formula (6), $R^4$ includes a straight-chain alkyl group such as methyl, ethyl or butyl; a branched alkyl group such as isopropyl, sec-butyl or t-butyl; an alkenyl group, e.g., vinyl, allyl, 1-propenyl or 1,3-butadiene; an aryl group, e.g., phenyl, nonylphenyl or benzyl; and an alkylaryl group.

It is preferred that the polymer gel comprises 85 to 99.5 mol % of unit (I) and 15 to 0.5 mol % of unit (II), particularly unit (II-a), based on the total amount of units (I) and (II).

According to the second aspect of the invention, the polymer gel which constitutes the matrix of the polymer electrolyte comprises (A) a unit derived from at least one monomer having one copolymerizable vinyl group, (B) a unit derived from a compound having two acryloyl groups and a (poly)oxyethylene group, and (C) a unit derived from a plasticizing compound having a polymerizable group.

The monomer having a copolymerizable vinyl group providing unit (A) and the compound having two acryloyl groups and a (poly)oxyethylene group providing unit (B) are the same as the monomer (I) and the cross-linking compound (II-a) which can be used in the first aspect of the invention.

The plasticizing compound (C) having a polymerizable group serves to further improve the low-temperature characteristics of a lithium battery in a discharge and the mechanical strength of the polymer gel. The plasticizing compound preferably has a solidification point of 60° C. or lower.

Such a polymerizable plasticizing compound includes compounds (II-b) used in the first aspect and organic carboxylic acid esters. The organic carboxylic acid esters include those having a polymerizable group in the acid component thereof and those having a polymerizable group in the alcohol component thereof. For example, (α-alkyl) acrylic esters and maleic esters, which contain a polymerizable group in their acid moiety, does not need to have a polymerizable group in their alcohol moiety. Examples of the (α-alkyl)acrylic esters and maleic esters are cyclohexyl esters, benzyl esters, isobornyl esters, 2-methoxyethyl esters, 2-ethoxyethyl esters, hydroxyethyl esters, hydroxyethylpropyl esters, trifluoroethyl esters, dimethylaminoethylbenzyl chloride salts, and dimethylaminoethyl chloride salts. Usable esters of succinic acid, phthalic acid, and hexahydrophthalic acid, which do not have a polymerizable group, include those having a polymerizable group in their alcohol moiety, such as (meth)acryloyloxyalkyl esters and glycidyl esters, and those derived from epoxidized acid components. The polymerizable plasticizing compound (C) may have two or more polymerizable groups, such as trimethylolpropane triacrylate.

Specific but non-limiting examples of the polymerizable plasticizing compound which can be used in the invention are benzylmethacrylate, isobornylmethacrylate, diethylaminoethylbenzylmethacrylate chloride, diethylaminoethylmethacrylate, dimethylaminoethylmethyl-methacrylate chloride, trifluoroethyl methacrylate, cyclohexyl-methacrylate, 2-methacryloyloxyethylphthalate, 2-methacryloyloxyethylhexahydrophthalate, butylepoxystearate, and dioctylepoxyhexahydrophthalate.

In addition or in place of the carboxylic esters, epoxidized fatty acid triglycerides, such as epoxidized soybean oil and epoxidized linseed oil, can also be used as a polymerizable plasticizing compound.

Of the polymerizable plasticizing compounds particularly preferred are those containing a quaternary ammonium salt.

The polymer gel constituting the polymer electrolyte according to the second aspect preferably comprises units (A) and (C) in a total proportion of 85 to 99.5 mol % and unit (B) of 15 to 0.5 mol % based on 100 mol % of the total amount of units (A), (B), and (C), and the proportion of unit (A) and unit (C) based on 100 mol % of the total amount of units (A) and (C) being. 75 to 99 mol % and 25 to 1 mol %, respectively.

If desired, the polymer gel of the second aspect may further comprise the unit derived compound (II-b) and/or the unit derived from the glycidyl ether (II-c).

The electrolyte present in the polymer electrolyte is held by the polymer gel in a dissolved state in a nonaqueous solvent, which is usually an organic solvent.

While any electrolyte in general use can be employed in the invention as previously mentioned, preferred electrolytes for use in lithium secondary batteries include lithium salts, such as $CF_3SO_3Li$, $C_4F_9SO_3Li$, $(CF_3SO_2)_2NLi$, $(CF_3SO_2)_3CLi$, $LiBF_4$, $LiPF_6$, $LiClO_4$, and $LiAsF_6$. Preferred solvents for use in lithium secondary batteries include cyclic carbonates, such as ethylene-carbonate and propylenecarbonate; acyclic carbonates, such as dimethylcarbonate and methylethylcarbonate; cyclic esters, such as γ-butyrolactone and propiolactone; amide compounds, such as dimethylacetamide; and nitrile compounds, such as acetonitrile and propionitrile.

Where the polymer electrolyte is used in capacitors, preferred electrolytes include the above-enumerated lithium salts and, in addition, other alkali metal (e.g., sodium, potassium or cesium) salts corresponding to the above-described lithium salts, ammonium salts (e.g., tetraalkylammonium salts), tetraalkylfluoroborates (e.g., $(C_2H_5)_4NBF_4$), tetraalkylphosphonium fluoroborates (e.g., $(C_2H_5)_4PBF_4$), tetraalkylphosphonium trifluorosulfonates (e.g., $(C_2H_5)_4PCF_3SO_3$), alkylpyridinium salts, and N-alkylimidazole salts. The nonaqueous solvents for this use preferably include organic solvents having a donor number of 0.1 or greater and a dielectric constant of 10.0 or greater. Examples of such organic solvents include those enumerated above for use in secondary batteries and, in addition, acid anhydrides (e.g., acetic anhydride), amide compounds (e.g., dimethylformamide and dimethylsulfoxide), phosphate compounds (e.g., trimethylphosphate and tributyl phosphate), and amine compounds (e.g., hydrazine, ethylenediamine, ethylamine, and triethylamine).

The polymer electrolyte of the invention can be obtained by synthesizing a polymer gel in the presence of an electrolyte or impregnating a separately prepared polymer gel with an electrolyte. The former method of preparation is preferred. In either method, the polymer gel is obtained by thermal polymerization of polymer gel components (monomers) in the presence of a radical polymerization initiator, such as benzoyl peroxide, acetyl peroxide, t-butyl hydroperoxide, cumene hydroperoxide, di-t-butyl peroxide, succinic acid peroxide, dicumyl peroxide, dichlorobenzoyl peroxide, α,α'-azobisisobutyronitrile (AIBN), dimethyl α,α'-azodiisobutyrate, and azodicyclohexylcarbonitrile.

The polymer gel can also be prepared by plasma polymerization or electron beam-, γ-ray-, X-ray-, or ultraviolet ray-induced polymerization. Photo-initiators which can be used in photo(UV)polymerization preferably include benzyl ketal, benzoinisopropyl ether, benzophenone, dimethylaminoacetophenone, 4,4'-bis(dimethylamino) benzophenone, 2-chlorothioxane, $(C_6H_5)_2IPF_6$, $(CH_3)_2N(C_6H_5)N_2PF_6$, $(C_6H_5)_3SPF_6$.

FIG. 1 is a cross-section schematically illustrating the structure of a polymer battery (secondary or primary) or a capacitor comprising the polymer electrolyte of the invention. The polymer battery 10 shown in FIG. 1 has a positive electrode 11, a negative electrode 12, and an electrolyte layer 13 interposed between the electrodes.

Where the polymer battery 10 is a lithium secondary battery, the negative electrode 12 is preferably made of at least one of metallic lithium, a lithium alloy, a substance capable of intercalating or deintercalating lithium, and an electrically conductive carbon material, and the positive electrode 11 is preferably made of a lithium salt of a metal oxide except a lithium oxide, an electron conducting substance, a redox-active polymer, an organic compound having a sulfide as a functional group, an inorganic sulfur compound, a π-electron conjugated polymeric material comprising a sulfide compound, a metal complex, a quinone polymer, and the like.

Where the polymer battery 10 is a capacitor, the negative electrode 12 comprises an electrically conductive metal compound capable of intercalating lithium, etc. (e.g., $TiS_2$, $MOS_2$ or $CoO_2$) or an electrically conductive polymer (e.g., polyaniline, polypyrrole, polythienylene, poly (alkylthiophene), polyquinone compounds), and the positive electrode 11 can be of metal or other conductive materials.

The electrolyte layer 13 may have a single layer structure or a multilayer structure having different polymer compositions.

The present invention will now be illustrated in greater detail with reference to Examples, but it should be understood that the invention is not constructed as being limited thereto.

In FIG. 2 is shown the measurement system used for evaluating the electrochemical characteristics of the polymer electrolytes prepared in Examples. FIG. 2A shows the plane view of the test cell connected to measuring instruments. FIG. 2B is the cross section of the measuring cell taken along line B—B and an apparatus 28 for observing the electrode interface. The test cell comprises glass plates 21 and 26, 1.0 mm thick lithium metal plates 22a and 22b sandwiched in between the glass plates 21 and 26 in parallel with a space of 3.0 mm therebetween, and a polymer electrolyte placed in the space formed by the two glass plates and the two lithium plates. A pair of 1.0 mm thick silicone rubber spacers 24a and 24b are provided to define the size of the polymer electrolyte sheet to be 3.0×5.0×1.0 mm³. Pieces of copper foil 23a and 23b are interposed between the glass plate 21 and the lithium plates 22a and 22b, respectively, to establish an electrical connection to an electrochemical instruments 27. A potentiostat/galvanostat electrolysis apparatus (Model 1287, manufactured by Solatron) was used as the measuring instrument 27. In the case of impedance measurement, a frequency response analyzer (Model 1250, manufactured by Solatron Co.) was connected to the electrolysis apparatus. In order to observe the interface between the lithium electrode and the polymer electrolyte, a microscope 28 equipped with a CCD video camera (Model XC-999, manufactured by Sony Corp.) was set above the test cell. The size of the polymer electrolyte prepared was 5.0×5.0×3.0 mm³ unless otherwise noted.

The device used for measuring the mechanical strength of a polymer electrolyte is shown in FIG. 3. A cube 34 of a polymer electrolyte was set between a fixed disk 31 and a vertically movable disk 32 having a diameter of 10 mm. A given load (10 mN/cm$^2$) was imposed to the polymer electrolyte 34 via the rod 33 connected to the disk 32, and the strain of the polymer electrolyte 34 in response to the load was measured with a dynamic mechanical analyzer (Model DMA7e, produced by Perkin-Elmer Co.) (not shown) equipped with a thermal analyzer (Model TA C7/D, manufactured by Perkin-Elmer Co.).

EXAMPLE 1

A polymer gel component (1) and an electrolyte solution (2) were mixed in a prescribed weight ratio (3). A prescribed amount of a polymerization initiator (4) was further added in the resulting solution. The resulting mixture was put in a glass container in an amount that would give a prescribed film thickness and allowed to react at 80° C. for 6 hours to prepare a polymer electrolyte. All these operations were conducted in a dry argon atmosphere. Composition of the resulting mixture:

(1) Polymer gel component

Methylmethacrylate (MMA)
    Triethyleneglycoldimethacrylate (TEGDM) ("Blenmer PDE150" produced by Nippon Oil and Fats Co., Ltd.; molecular weight: 286.33
    MMA/TEGDM = 99/1 by mole (2) Electrolyte solution Nonaqueous solvent:
    Ethylenecarbonate (EC)
    Propylenecarbonate (PC)
    Electrolyte: LiBF$_4$
    EC/PC/LiBF$_4$ = 52/41/7 by mole (3) (MMA + TEGDM)/electrolyte solution = 10/90 by weight (4) Polymerization initiator α, α'-Azobisisobutyronitrile (AIBN)
    AIBN/MMA = 0.6/99.4 by mole The electrochemical properties and physical properties of the resulting polymer electrolyte were evaluated as follows.

1) Ionic Conductivity

A sheet of 3 mm by 5 mm was cut out of the resulting polymer gel electrolyte having a thickness of 1 mm and set in the measuring cell shown in FIG. 2. The frequency response of alternating current impedance was measured. Analysis of the frequency response revealed that the ionic conductivity of the polymer electrolyte of Example 1 was as high as $2 \times 10^{-3}$ S/cm (25° C.).

2) Dendrite Growth

A constant current density of 1 mA/cm$^2$ was flowed through the resulting polymer electrolyte 25 for 1 hour. Thereafter, the interface between the lithium plate 22a and the polymer electrolyte 25 was observed and photographed under the microscope equipped with the CCD video camera. As can be seen from FIG. 4C, the interface was smooth, proving that the polymer electrolyte of Example 1 inhibits appreciable dendrite formation on the interface of the lithium negative electrode.

3) Weight-loss

The polymer gel electrolyte prepared in Example 1 was stored in a dry box thermostat-regulated at 20° C. for 14 days, but the leakage of liquid out of the gel was not observed. Further, the weight loss of the polymer electrolyte was as low as about 1%. From these results it was proved that the polymer gel electrolyte of Example 1 is capable of sufficiently holding an organic solvent.

Comparative Example 1

A polymer gel electrolyte was prepared in the same manner as in Example 1, except that TEGDM was not used as a comonomer. The characterization of dendrite depression effect of the resulting polymer gel was evaluated in the same manner as in Example 1-(2). As a result, dendritical growth was observed on the interface between the polymer gel and the lithium negative electrode as shown in the micrograph of FIG. 4A.

EXAMPLE 2

Figure 4B:
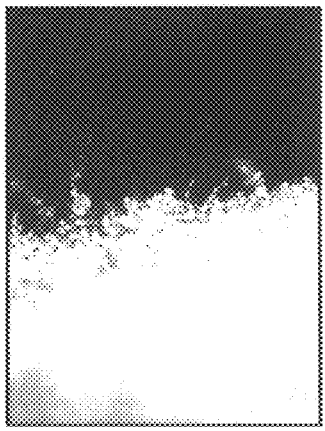
Figure 4C:
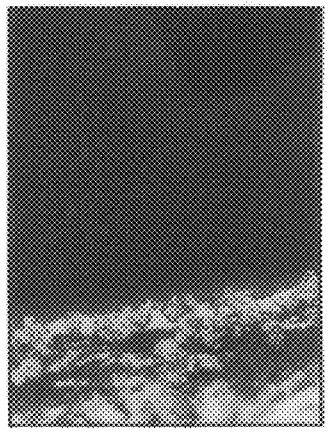

A polymer electrolyte was prepared in the same manner as in Example 1, except for reducing the amount of TEGDM to 0.5 mol % based on the total monomers. The characterization of the resulting polymer gel was evaluated in the same manner as in Example 1-(2). The micrograph of the interface between the polymer electrolyte and the lithium negative electrode is shown in FIG. 4B, which reveals that dendrites had formed uniformly but were suppressed from growing.

EXAMPLE 3

A polymer electrolyte was prepared in the same manner as in Example 1, except for changing the weight ratio of the total monomers to the nonaqueous electrolyte solution to 17:83. The resulting polymer was found to have an ionic conductivity of $1.8 \times 10^{-4}$ S/cm (25° C.) as measured in the same manner as in Example 1-(1). Further experiments were conducted to fill the gap between Example 1 and the above experiment. As a result, it was ascertained that the ionic conductivity drastically decreases with the weight ratio of the polymer gel in the polymer electrolyte increasing to about 15% or more.

EXAMPLE 4

A polymer electrolyte was prepared in the same manner as in Example 1, except for increasing the amount of TEGDM to 4.0 mol % based on the total monomers. The resulting polymer electrolyte was evaluated in the same manner as in Example 1-(3). As a result, the loss of the weight after 14-day storage was not greater than 1%.

EXAMPLE 5

A polymer electrolyte was prepared in the same manner as in Example 1, except for increasing the amount of TEGDM to 8.0 mol % based on the total monomers. The leakage of solution out of the resulting polymer electrolyte was evaluated in the same manner as in Example 1-(3). As a result, the weight loss after 14-day storage was about 3%.

Figure 5A:
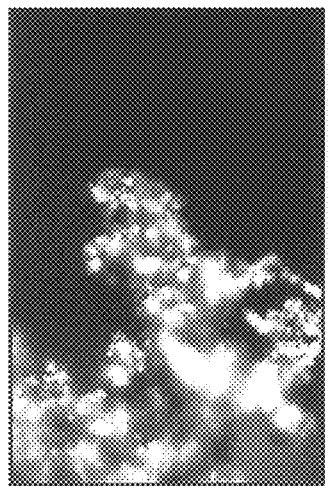
FIG. 5 shows micrographs of the interfaces between a lithium electrode and a polymer electrolyte prepared in Comparative Example 1 (FIG. 5A), Example4 (FIG. 5B), and Example 5 (FIG. 5C), taken after constant current electrolysis at a current density of 3 mA/cm$^2$ for 1 hour.
Figure 5B:
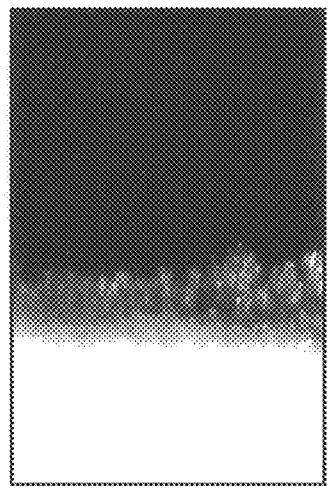
Figure 5C:
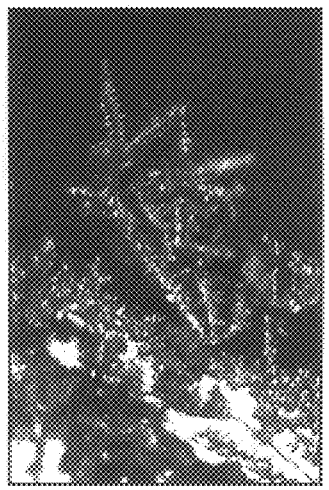

The dendrite depression effect of the polymer electrolytes prepared in Comparative Example 1 and Examples 4 and 5 were evaluated in the same manner as in Example 1-(2), except for increasing the current density to 3 mA/cm$^2$. The micrographs taken at the electrode interface are shown in FIGS. 5A, 5B and 5C, respectively. Because the rate and amount of deposition of metallic lithium increase with an increase in current density, growth of lithium dendrites could not be prevented even with the increased copolymer ratio of TEGDM, a cross-linking reagent. With the polymer electrolyte of Example 4, slight formation of dendrites was observed, but their growth was suppressed.

EXAMPLE 6

A polymer electrolyte was prepared in the same manner as in Example 1, except for replacing MMA with acrylonitrile.

As a result of the same evaluation as in Example 1, suppression of dendrite growth was confirmed. The ionic conductivity was $2.0 \times 10^{-3}$ S/cm (25° C.), and the loss of the weight after 14-day storage was 1.0% (measuring temperature: 25±0.1° C.).

EXAMPLE 7

A lithium secondary battery having the structure shown in FIG. 1 was made by using the polymer electrolyte prepared in Example 6 as an electrolyte layer 13, a metal substrate coated with a composite film of 2,5-dimercapto-1,3,4-thiadiazole (DMcT) and polyaniline as a positive electrode 11, and metallic lithium as a negative electrode 12. The positive electrode film was prepared in accordance with the method reported by Oyama et al. (*Nature, vol.* 373, pp. 598–600 (1995)).

Figure 6:
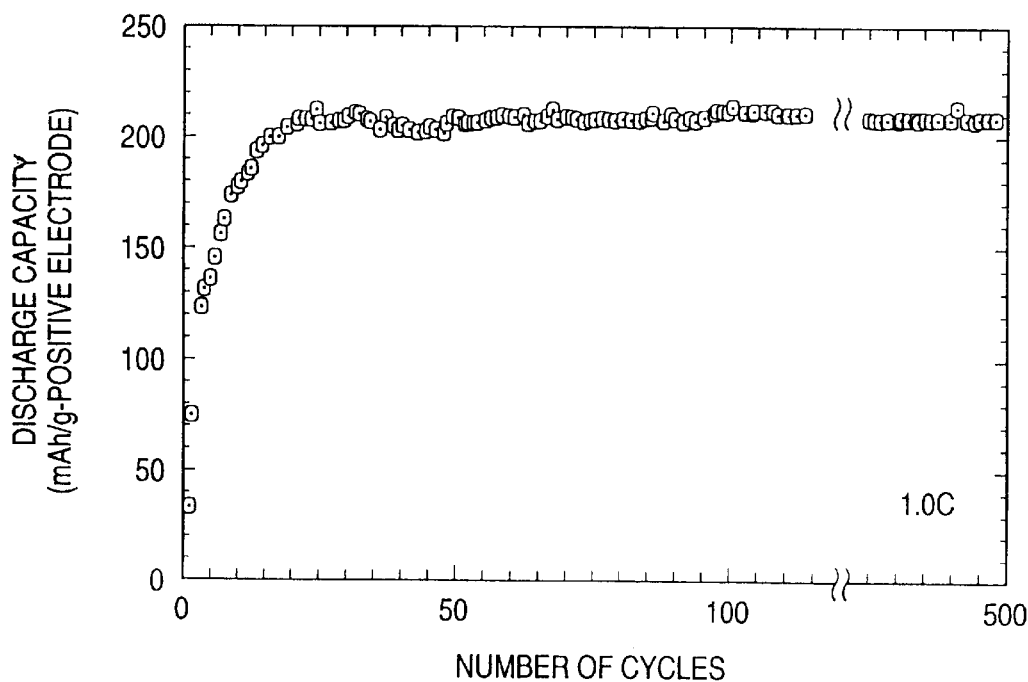
FIG. 6 is a graph showing the relationship between discharge capacity and charge and discharge cycles (1.0 C rate) in the lithium secondary battery prepared in Example 7.
Figure 7:
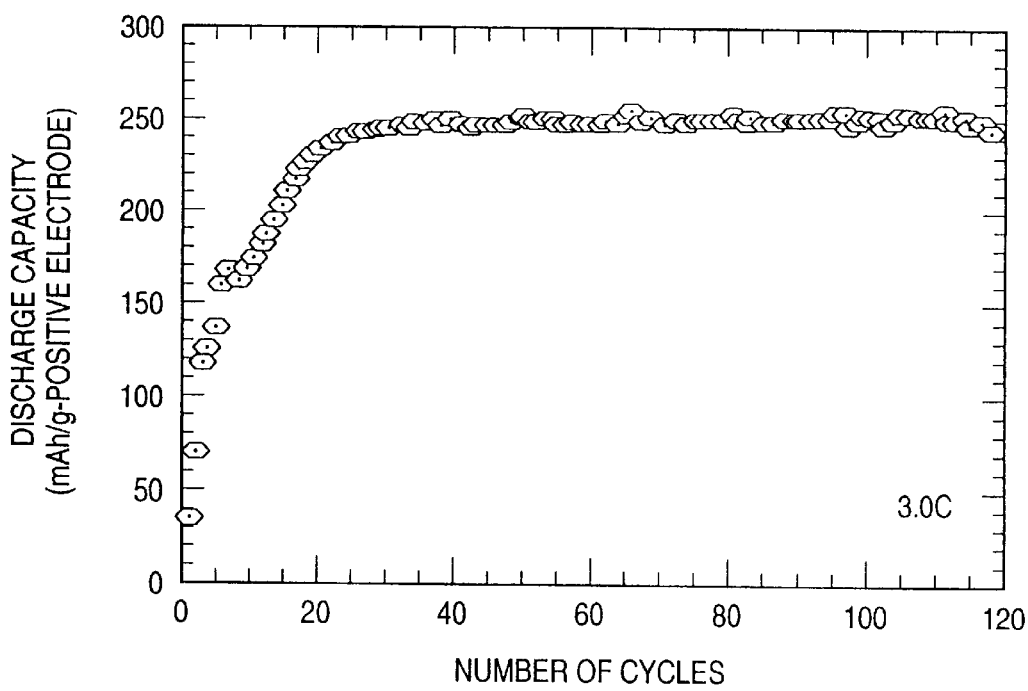
FIG. 7 is a graph showing the relationship between discharge capacity and the number of charge and discharge cycles (3.0 C rate) in the lithium secondary battery prepared in Example 7.

The resulting lithium secondary battery was subjected to a charge and discharge test at a rate of 1.0 C, and the change in discharge capacity with the charging and discharging cycles was measured at 20° C. The charging capacity was set at 80% of that estimated from the amount of the redox active materials. The results obtained are shown in FIG. 6. While not shown in FIG. 6, it was confirmed that discharge energy of 217 mAh/g-positive electrode was obtained up to 1000 charge and discharge cycles. When the charge and discharge test was carried out at a rate of 3.0 C (the results obtained are shown in FIG. 7), charge and discharge cycles could be continued with feature inferiority trouble. It has thus been proved that the battery of Example 6 could achieve high rate charges and discharges that have been deemed difficult with lithium batteries using sulfur-containing electrode active materials.

Figure 8:
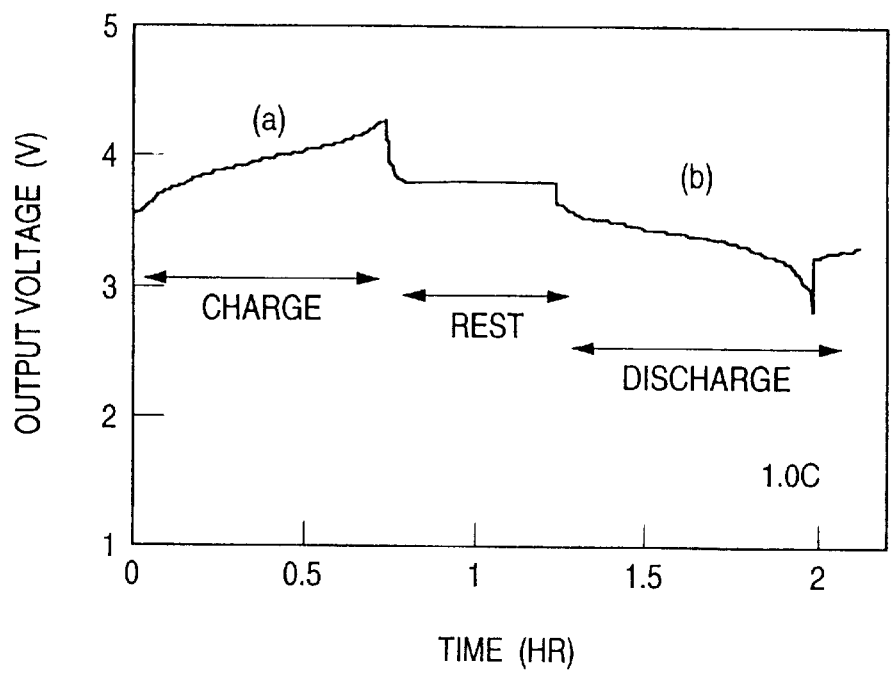
FIG. 8 is a graphical representation illustrating the charge and discharge characteristics (1.0 C) of the lithium secondary battery prepared in Example 7.

The charge and discharge characteristics of the battery at 1.0 C are graphically represented in FIG. 8. As is seen from FIG. 8, an output voltage of 3.4 to 3.2 V was obtained stably in a discharge process. In the graph, area (a) is an 80% charge taking 48 minutes. Since the charge and discharge efficiency is approximately 100%, the discharging time in area (b) is also 48 minutes.

Figure 9:
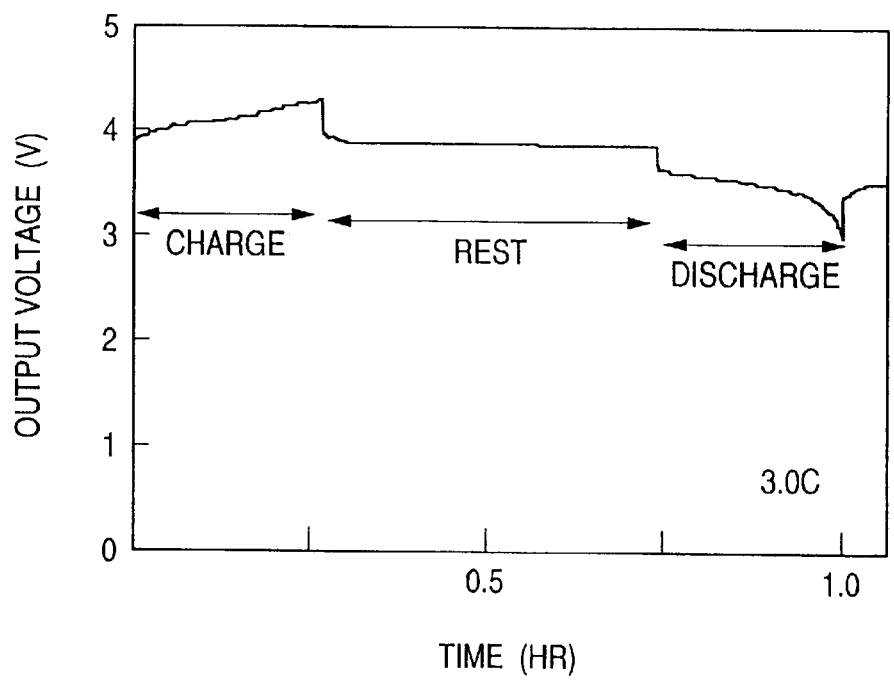
FIG. 9 is a graphical representation illustrating the charge and discharge characteristics (3.0 C) of the lithium secondary battery prepared in Example 7.

The charge and discharge characteristics at 3.0 C are shown in FIG. 9.

EXAMPLES 8 TO 12

Polymer gel electrolytes were prepared in the same manner as in Example 1, except for replacing TEGDM, a cross-linking compound, with other (poly)oxyethylenedimethacrylates represented by formula (1) wherein R is $CH_3$, and n is shown in Table 1 below. The dendrite depression effect of the resulting polymer electrolytes were evaluated in the same manner as in Example 1-(2). The results obtained are shown in Table 1. The ionic conductivity of these polymer electrolytes were in the range of from $1 \times 10^{-4}$ to $1 \times 10^{-3}$ S/cm as measured in the same manner as in Example 1-(1).

TABLE 1

| Example No. | Cross-link-ing Compound | n in Formula (1) | Viscosity (cP) | Dendrite Growth |
|---|---|---|---|---|
| 8 | Blenmer PDE50 | 1 | — | not observed |
| 9 | Blenmer PDE100 | 2 | 5 (25° C.) | " |

TABLE 1-continued

| Example No. | Cross-link-ing Compound | n in Formula (1) | Viscosity (cP) | Dendrite Growth |
|---|---|---|---|---|
| 10 | Blenmer PDE200 | 4 | 10–20 (25° C.) | " |
| 11 | Blenmer PDE400 | 9 | 50–70 (25° C.) | " |
| 12 | Blenmer PDE600 | 14 | about 80 (40° C.) | " |

EXAMPLES 13 TO 21

Polymer electrolytes were prepared in the same manner ample 1, except for replacing TEGDM, a cross-linking with the compounds represented by formula (3-1) or shown in Table2 below. The dendrite depression effects resulting polymer electrolytes were evaluated in the same as in Example 1-(2). The results obtained are shown in The ionic conductivities of these polymer electrolytes the range of from $1 \times 10^{-4}$ to $1 \times 10^{-3}$ S/cm as measured same manner as in Example 1-(1).

TABLE 2

| Example No. | Compound (3-1) or (3-2) | s in Formula (3-1) or (3-2) | Viscosity (cP) | Dendrite Growth |
|---|---|---|---|---|
| 13 | Blenmer PE90 | 2 | 10 (25° C.) | observed |
| 14 | Blenmer PE200 | 4 | 26 (25° C.) | not observed |
| 15 | Blenmer PE350 | 8 | 61 (25° C.) | " |
| 16 | Blenmer PME50 | 1 | — | slightly observed |
| 17 | Blenmer PME100 | 2 observed | — | slightly |
| 18 | Blenmer PME150 | 3 observed | — | slightly |
| 19 | Blenmer PME200 | 4 observed | — | slightly |
| 20 | Blenmer PME400 | 9 observed | — | slightly |
| 21 | Blenmer PME4000 | 98 observed | — | slightly |

EXAMPLES 22 TO 24

Polymer electrolytes were prepared in the same manner example 1, except for additionally using the compound represented by formula (3-1) shown in Table 3 below as a comonomer A/TEGDM/compound (3-1) molar ratio of 98:1:1. The depression effects of the resulting polymer electrolytes were evaluated in the same manner as in Example The results obtained are shown in Table 3. The ionic conductivities of these polymer electrolytes were in the range of from $1 \times 10^{-4}$ to $1 \times 10^{-3}$ S/cm as measured in the same manner as in Example 1-(1).

TABLE 3

| Example No. | TEGDM | Compound (3-1) | Dendrite Growth |
|---|---|---|---|
| 22 | Blenmer PDE150 | Blenmer E (s = 1) | not observed |
| 23 | " | Blenmer PE200 (s = 4) | " |
| 24 | " | Blenmer PE350 (s = 8) | " |

The above results prove that the polymer electrolytes according to the invention exhibit excellent performance in suppressing dendrite growth on the metallic lithium interface, preventing leakage of the electrolyte solution out of the gel, and effective transport of lithium ion in the polymer, high ionic conductivity, and sufficient mechanical strength.

Comparative Example 2

Polyacrylonitrile (PAN) was thoroughly ground in a mortar and dried at 80±0.1° C. for 12 hours. The PAN powder was thoroughly mixed with a nonaqueous electrolyte solution at a weight ratio of 10:90. The nonaqueous electrolyte solution was prepared by dissolving $LiClO_4$ at a concentration of 1 mol/l in a 1:1 (by volume) mixture of ethylene carbonate (EC) and propylene carbonate (PC). The resulting solution was put in a glass container and allowed to react at 140° C. for 10 minutes in a dry argon atmosphere, followed by cooling at –15° C. for 16 hours to prepare a PAN gel electrolyte.

The solution holding capability of the resulting polymer gel electrolyte was evaluated from its weight-loss. It was found as a result that the polymer gel began to leak liquid within 24 hours. The weight-losses of the polymer gel on 24 hours', 48 hours', 5 days', 10 days', 30 days' and 40 days' standing were 6 wt %, 12 wt %, 24 wt %, 32 wt %, 37 wt %, and 40 wt %, respectively. Further standing resulted in no change in weight.

EXAMPLES 25 AND 26

The same experiment as in Comparative Example 2 was carried out, except that the PAN was replaced with an MMA/TEGDM polymer gel (Example 25) or an MMA/ethylene glycol dimethacrylate (EGDM) polymer gel (Example 26). The results obtained are shown in Tables 4 and 5, respectively. As is apparent from Tables 4 and 5, the weight-loss of either polymer gel electrolytes is markedly smaller than observed with the PAN polymer gel electrolyte.

TABLE 4

Polymer Electrolyte of Example 25

| MMA/TEGDM (Molar Ratio) | Weight-Loss (%) on Standing | | |
|---|---|---|---|
| | for 2 days | for 9 days | for 14 days |
| 99/1 | 1 | 1 | — |
| 98/2 | 1 | 3 | — |
| 96/4 | 1 | 1 | 1 |
| 92/8 | 1 | 2 | 3 |

TABLE 5

Polymer Electrolyte of Example 26

| MMA/EGDM (Molar Ratio) | Weight Loss (%) on Standing | | | |
|---|---|---|---|---|
| | for 1 day | for 2 days | for 9 days | for 13 days |
| 99/1 | 4.5 | 1.5 | 5.0 | 5.0 |
| 98/2 | 4.5 | 16.0 | 20.0 | 19.5 |
| 96/4 | 6.0 | 16.0 | 20.0 | 20.0 |
| 92/8 | 4.5 | 6.5 | 10.0 | 10.0 |

Figure 10:
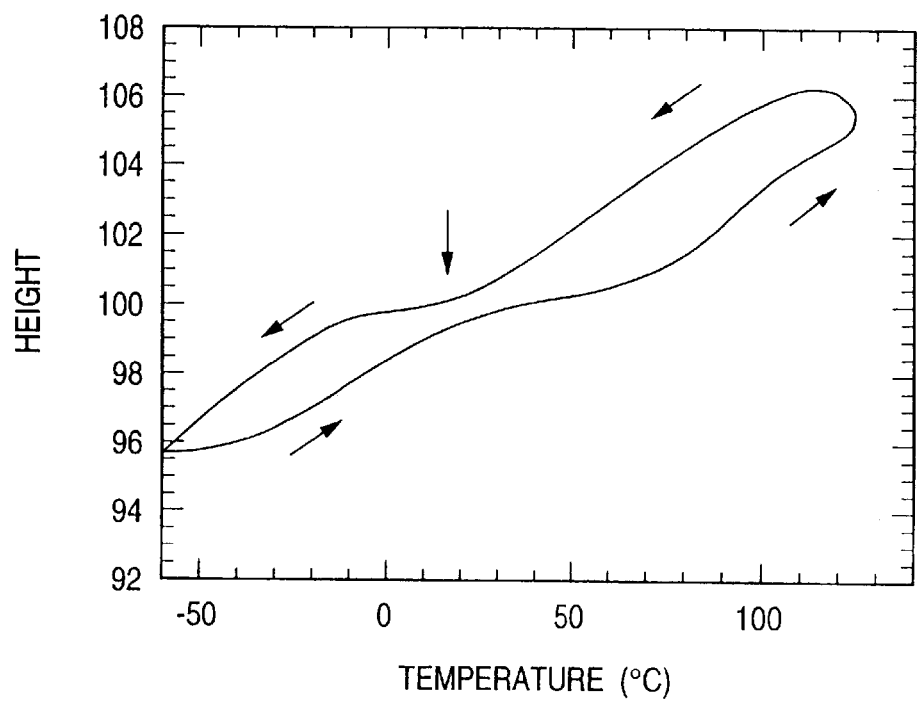
FIG. 10 is a graph showing the mechanical characteristics of the polymer electrolyte prepared in Example 27 with respect to temperatures.

A polymer gel component (1) and an electrolyte solution (2) were mixed in a prescribed weight ratio (3). A prescribed amount of a polymerization initiator (4) was further added the resulting solution to prepare a solution. The solution was put in a glass container in an amount that would give a prescribed film thickness and allowed to react at 80° C. for 6 hours to prepare a polymer electrolyte. All these operations were conducted in a dry argon atmosphere.
Composition of Reactive Mixture:
(1) Polymer gel component
  MMA
  Dimethylaminoethylmethacrylatemethyl chloride salt (DMC) (trade name: Acryl Ester DMC)
  Triethylene glycol dimethacrylate (TEGDM) (trade name:
  Acryl Ester 3ED)
  MMA/DMC/TEGDM=92.6/3.7/3.7 by mole
2) Electrolyte solution
  Nonaqueous solvent: EC and PC
  Electrolyte: $LiBF_4$
  $EC/PC/LiBF_4$=67/26/7 by mole
(3) (MMA+DMC+TEGDM)/electrolyte solution=20/80 by weight
(4) Polymerization initiator
  AIBN
  AIBN/MMA=1.61/98.39 by mole The load-strength behavior of the resulting polymer electrolyte was measured by use of the device shown in FIG. 3 at varying measurement temperatures. The measurment temperature was scanned at the rate of 5° C./min. from 20° C. to –60° C., which was maintained for 1 hour, then scanned up to 130° C., and again dropped to 20° C. The hysteresis loop of the temperature dependence of strain under load is shown in FIG. 10, in which the initial height of the cubic test piece was taken as 100 (the same manner applies to FIGS. 11 through 19). As can be seen from FIG. 10, the polymer electrolyte of Example 27 demonstrates satisfactory plastic flow, exhibiting restoring force over a broad temperature range (–60° C. to 130° C.).

Figure 11:
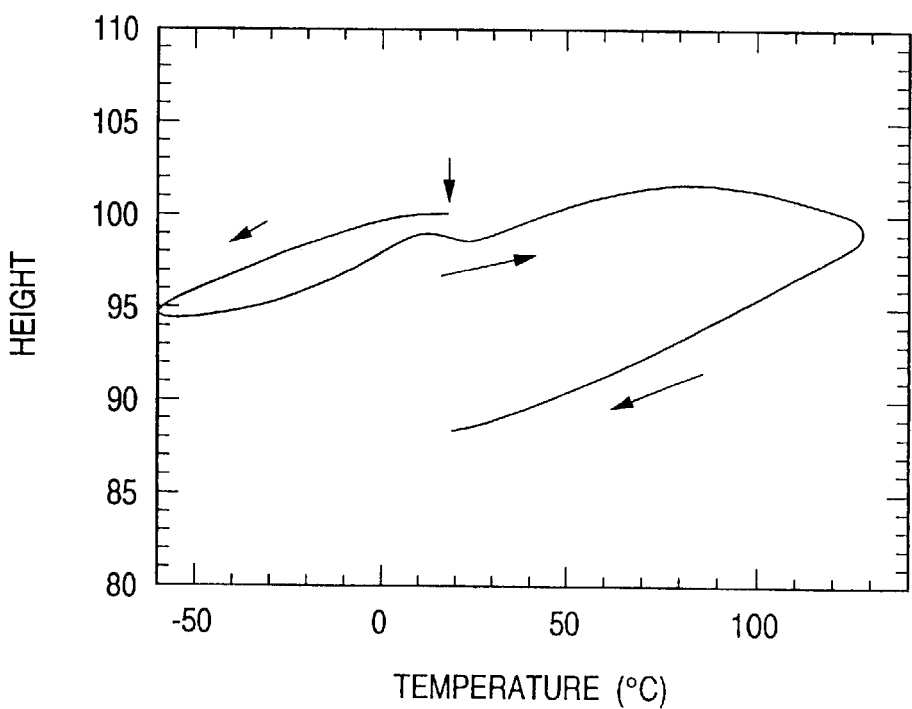
FIG. 11 is a graph showing the mechanical characteristics of the comparative polymer electrolyte prepared in the same manner as in Example 27, except for using no plasticizing compound, with respect to temperatures.

For reference, a polymer electrolyte was prepared and evaluated in the same manner as described above, except that DMC was not used and that the MMA/TEGDM molar ratio was changed to 96.2/3.8. The results obtained are shown in FIG. 11. It is seen that this polymer electrolyte underwent irreversible internal shear fracture (the term "irreversible" is intended to mean that recovery requires so long a time that the strain is irreversible within the observation time), showing weaker restoring force than the polymer gel of Example 27. In other words, the elastic characteristics and mechanical strength of the polymer electrolyte can be improved further by copolymerizing a methacrylic ester having a low solidification point as a plasticizing compound.

EXAMPLE 28

Figure 12:
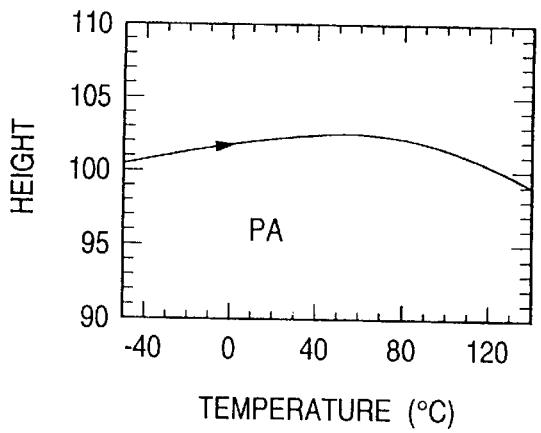
FIG. 12 is a graph showing the mechanical characteristics of the polymer electrolyte prepared in Example 28, with respect to temperatures.

A polymer electrolyte was prepared from the following reaction mixture in the same manner as in Example 27.
Composition of Reaction Mixture:
(1) Polymer gel component
  MMA
  2-Methacryloyloxyethylphthalate (trade name: Acryl Ester PA)
  TEGDM (trade name: Acryl Ester 3ED)
  MMA/PA/TEGDM=94.3/1.9/3.8 by mole
(2) Electrolyte solution
  Nonaqueous solvent: EC and PC
  Electrolyte: $LiClO_4$
  $EC/PC/LiClO_4$=67/26/7 by mole
(3) (MMA+PA+TEGDM)/electrolyte solution=15/85 by weight
(4) Polymerization initiator
  AIBN
  AIBN/MMA=1.54/94.3 by mole The characterization of the resulting polymer electrolyte was performed in the same manner as in Example 27, except that the measuring temperature was started from −50° C. and raised up to 140° C. The results obtained are shown in FIG. 12. As is seen from FIG. 12, the height of the test piece of the polymer electrolyte was substantially unchangeable at a temperature elevating from −50° C. to 140° C. under a constant load. The reduction in height under the load at 130° C. was 2%. The polymer electrolyte was thus proved to show an extremely small strain under load over a broad range of temperature.

EXAMPLES 29 TO 35

Polymer electrolytes were prepared in the same manner as in Example 28, except for replacing 2-methacryloyloxyethyl phthalate (PA) with the polymerizable plasticizing compounds described below, and their mechanical characteristics were measured in the same manner as in Example 28. The results obtained are shown in FIG. 13 to 19.

EXAMPLE 29

Benzylmethacrylate (Trade Name: Acryl Ester BZ)

EXAMPLE 30

Isobornylmethacrylate (Trade Name: Acryl Ester IBX)

EXAMPLE 31

Dimethylaminoethyl Methacrylate Benzyl Chloride (Trade Name: Acryl Ester DML60)

EXAMPLE 32

2-Methacryloyloxyethylhexahydrophthalate (Trade Name: Acryl Ester HH)

EXAMPLE 33

Diethylaminoethylmethacrylate (Trade Name: Acryl Ester DM)

EXAMPLE 34

Trifluoroethylmethacrylate (Trade Name: Acryl Ester 3FE)

EXAMPLE 35

Cyclohexylmethacrylate (Trade Name: Acryl Ester CH)

Figure 13:
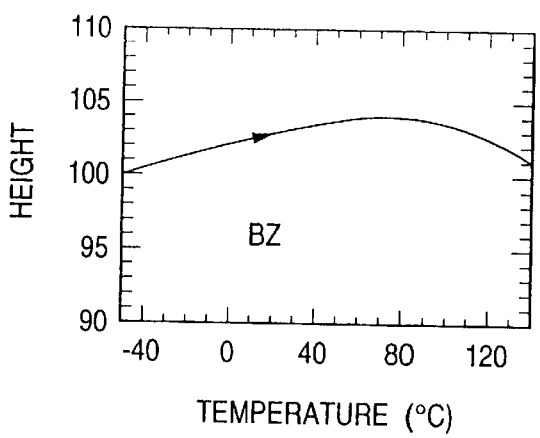
FIG. 13 is a graph showing the mechanical characteristics of the polymer electrolyte prepared in Example 29, with respect to temperatures.
Figure 14:
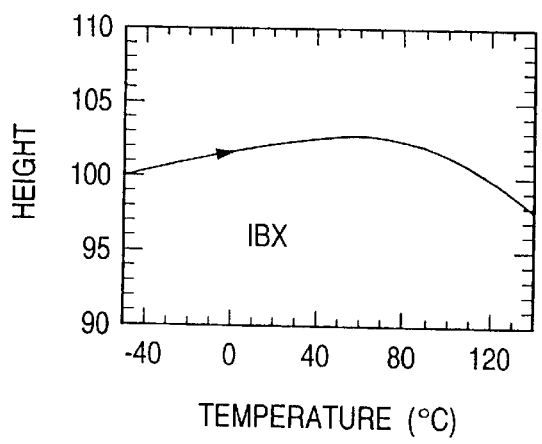
FIG. 14 is a graph showing the mechanical characteristics of the polymer electrolyte prepared in Example 30, with respect to temperatures.
Figure 15:
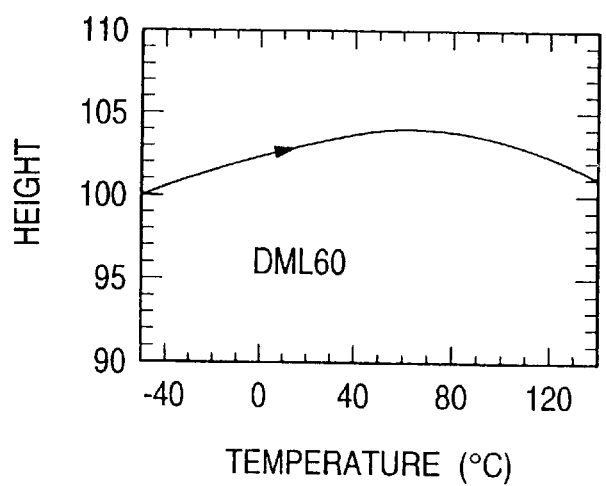
FIG. 15 is a graph showing the mechanical characteristics of the polymer electrolyte prepared in Example 31, with respect to temperatures.
Figure 16:
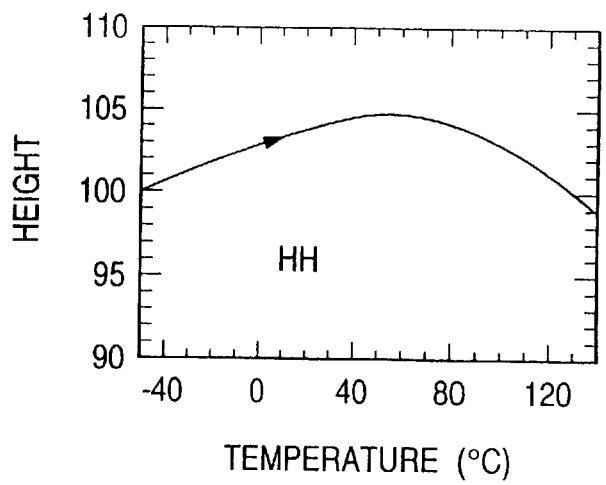
FIG. 16 is a graph showing the mechanical characteristics of the polymer electrolyte prepared in Example 32, with respect to temperatures.
Figure 17:
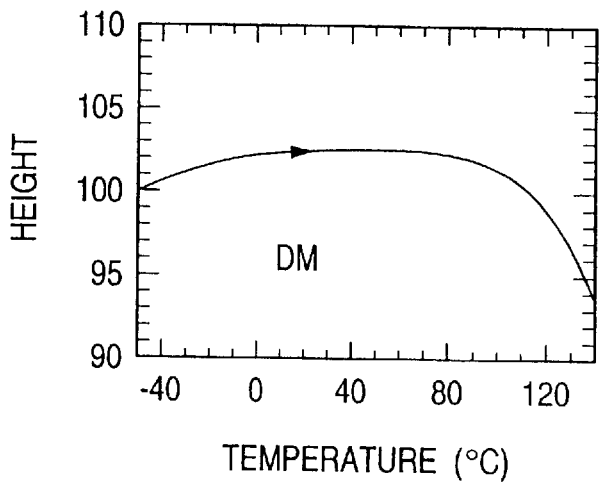
FIG. 17 is a graph showing the mechanical characteristics of the polymer electrolyte prepared in Example 33, with respect to temperatures.
Figure 18:
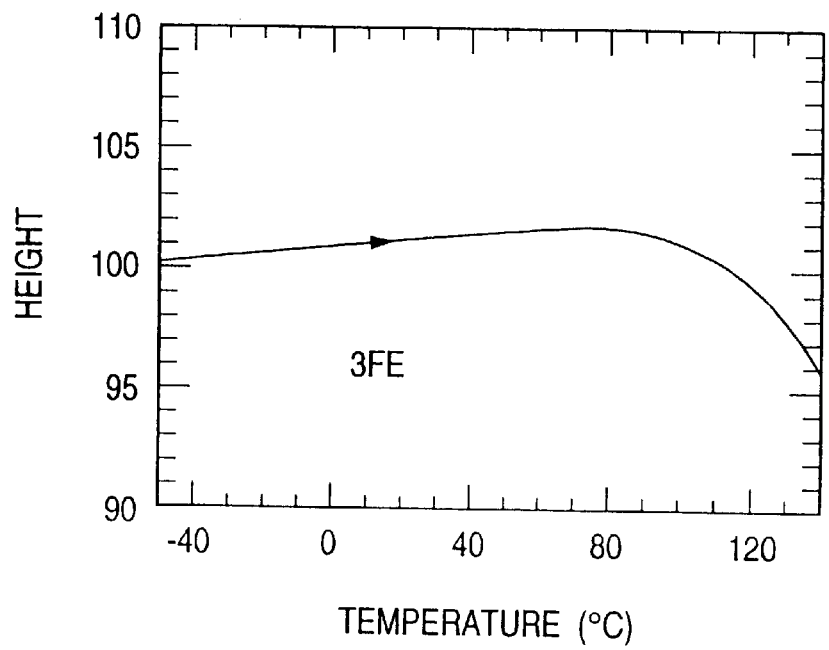
FIG. 18 is a graph showing the mechanical characteristics of the polymer electrolyte prepared in Example 34, with respect to temperatures.
Figure 19:
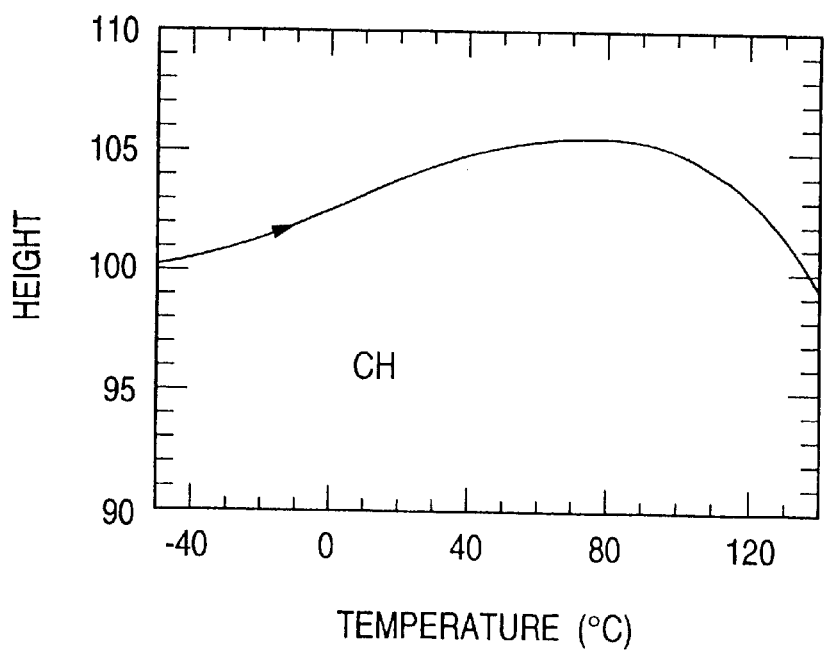
FIG. 19 is a graph showing the mechanical characteristics of the polymer electrolyte prepared in Example 35, with respect to temperatures.

The polymer electrolytes of Examples 29 to 31 exhibited excellent thermal stability, undergoing substantially no change in height under the constant load even at elevated temperatures (see FIGS. 13 to 15). Those of Examples 32 to 35 once increased their height in temperatures ranging about 400 to about 60° C. and then decreased 2 to 4% at 120° C. (see FIGS. 16 to 19). From these results, the following observations can be drawn. Incorporation of a plasticizing monomer having a high viscosity is generally expected to provide a polymer gel having increased elasticity. Copolymerization of a plasticizing monomer having an aromatic ring on its side chain provides a polymer electrolyte having particularly excellent thermal characteristics. Copolymerization of a plasticizing monomer having a low solidification point and a high viscosity provides a polymer electrolyte having excellent mechanical characteristics in low temperature.

EXAMPLES 36 TO 39

Each of the following reactive mixtures was allowed to react at 60° C. for 6 hours to prepare the polymer electrolytes shown in Table 6 below.
Composition of reactive mixture:
(1) Polymer gel component
  MMA/TEGDM=96.0/4.0 (by mole)
(2) Polymerization initiator
  AIBN
  AIBN/MMA=1.57/96.0 (by mole)
(3) Electrolyte solution
  (i) $EC/PC/LiBF_4$=52/41/7 (by mole)
  (ii) $EC/PC/LiPF_6$=52/41/7 (by mole)
(4) (MMA+TEGDM)/electrolyte solution weight ratio
  (i) 10/90
  (ii) 20/80

The ionic conductivity of the resulting polymer electrolytes as measured in the same manner as in Example 1 are also shown in Table 6.

TABLE 6

| Example No. | Polymer Electrolyte Electrolyte | (MMA + TEGDM)/Electrolyte solution (by weight) | Ion Conductivity (S/cm) |
| --- | --- | --- | --- |
| 36 | $LiBF_4$ | 10/90 | $2.1 \times 10^{-3}$ |
| 37 | $LiPF_6$ | 10/90 | $3.4 \times 10^{-3}$ |
| 38 | $LiBF_4$ | 20/80 | $1.2 \times 10^{-3}$ |
| 39 | $LiPF_6$ | 20/80 | $1.5 \times 10^{-3}$ |

As can be seen from Table 6, any electrolyte system had a high ionic conductivity on the order of $10^{-3}$ S/cm. The ionic conductivity was higher in the system using $LiPF_6$ as an electrolyte than the system using $LiBF_4$, with the polymer gel/electrolyte solution weight ratio being equal. Incidentally, the $EC/PC/LiBF_4$ system froze and got white turbid at −20° C. or lower, whereas the $EC/PC/LiPF_6$ did not freeze even at −50° C.

EXAMPLES 40 TO 43

Polymer electrolytes were prepared in the same manner as in Examples 36 to 39, except for using MMA and Blenmer PDE400 (cross-linking compound, the compound of formula (1) wherein R=$CH_3$, n=9) as a polymer gel component at a varied molar ratio as shown in Table 7 below and using $EC/PC/LiPF_4$ (molar ratio: 67/26/7) as an electrolyte solution at a (MMA+Blenmer PDE400)/electrolyte solution weight ratio of 20/80. The ionic conductivity of the resulting polymer electrolytes are plotted iv FIG. 20.

TABLE 7

Figure 20:
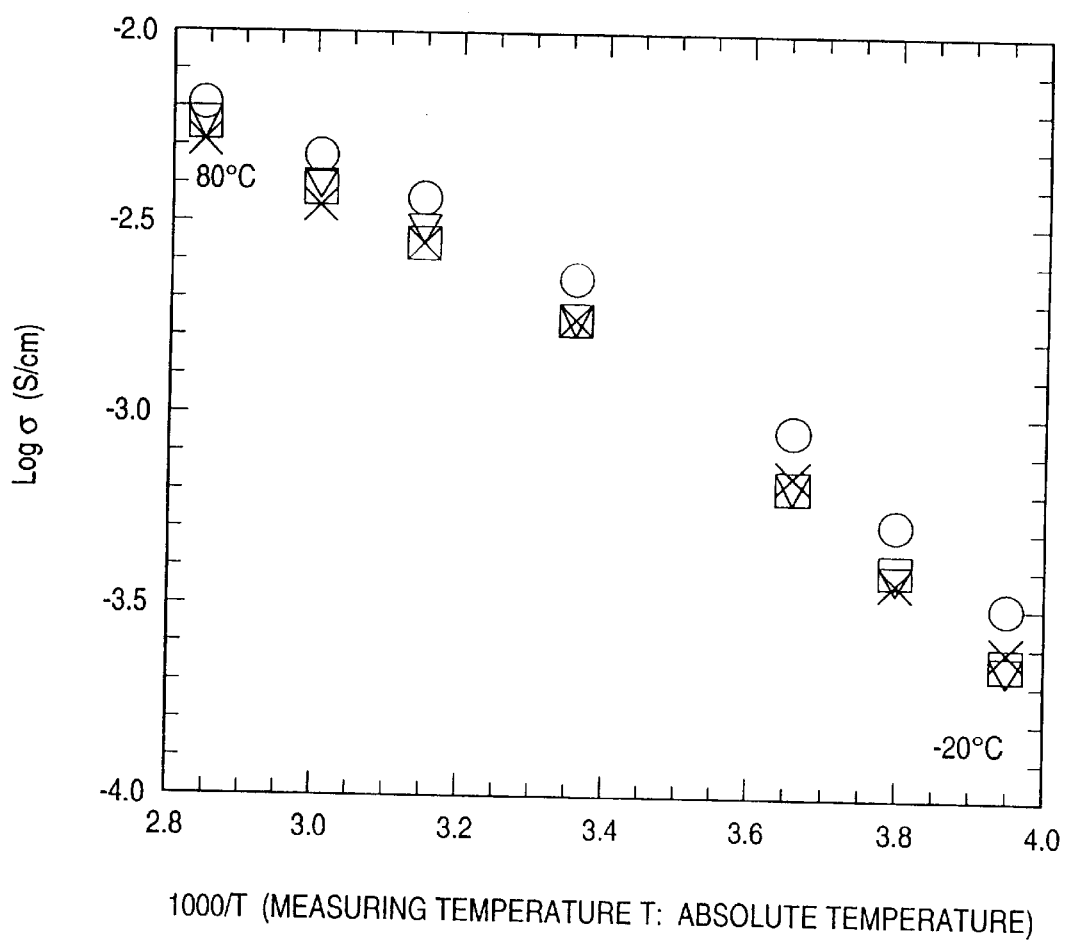
FIG. 20 is the plots of ionic conductivity vs. temperature, of polymer electrolytes different in copolymerization ratio of a cross-linking compound.

| Example No. | MMA/Cross-linking Compound (Molar Ratio) | Symbol in FIG. 20 |
|---|---|---|
| 40 | 92.6/7.4 | □ |
| 41 | 96.2/3.8 | ○ |
| 42 | 98.0/2.0 | ▽ |
| 43 | 99.0/1.0 | x |

EXAMPLES 44 TO 47 polymer electrolytes were prepared in the same manner as in Examples 36 to 39, except for using MMA and the cross-linking compound represented by formula (1), wherein R is $CH_3$ and is as shown in Table 8 below at a molar ratio of 96/4 and using $EC/PC/LiPF_4$ (molar ratio: 67/26/7) as an electrolyte solution at a (MMA+cross-linking compound)/electrolyte solution weight ratio of 20/80. The ionic conductivity of the resulting polymer electrolytes is plotted in FIG. 21.

TABLE 8

Figure 21:
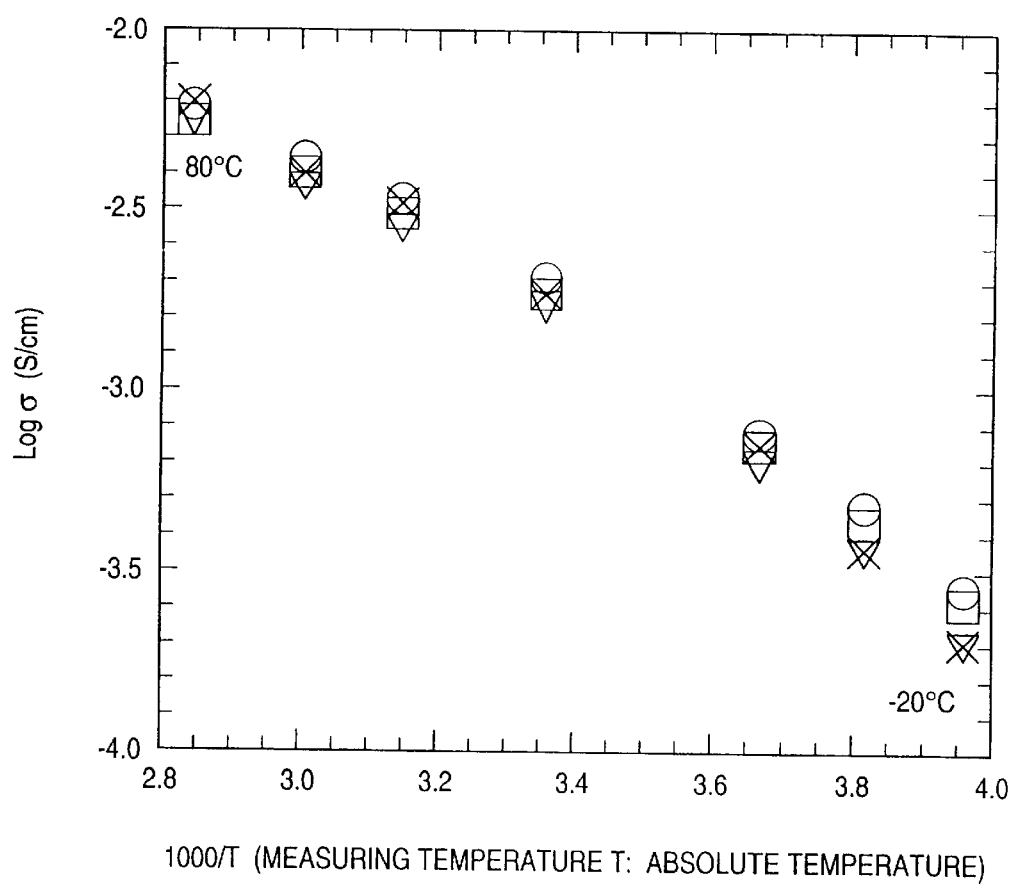
FIG. 21 is the plots of ionic conductivity vs. temperature, of polymer electrolytes different in polyoxyethylene chain length of a cross-linking compound.

| Example No. | Cross-Linking Compound | n in Formula (1-1) | Symbol in FIG. 21 |
|---|---|---|---|
| 44 | Blenmer | 1 | ○ |
| 45 | Blenmer PDE150 | 3 | □ |
| 46 | Blenmer PDE400 | 9 | ▽ |
| 47 | Blenmer PDE600 | 14 | x |

As can be seen from FIG. 21, the ionic conductivity of these polymer electrolytes changed from about $3.2 \times 10^{-2}$ S/cm to $2.3 \times 10^{-3}$ S/cm at a measuring temperature falling from 80° C. to −20° C. The length of the oxyethylene chain of the cross-linking compound (i.e., n in formula (1-1)) was not so influential on the ionic conductivity.

EXAMPLES 48 TO 52

Polymer electrolytes were prepared by allowing a reaction mixture to react at 60° C. for 6 hours. The reaction mixture consisted of MMA/TEGDM/plasticizing monomer (=94.3/3.8/1.9 by mole) as a polymer gel component, AIBN (AIBN/MMA=1.57/96.0 by mole) as a polymerization initiator, and $EC/PC/LiClO_4$ (=67/26/7 by mole) as an electrolyte solution at a total monomers/electrolyte solution weight ratio of 10/90.

In order to measure the inerfacial resistance of the cell, two-electrode type of cell was set by using each of the resulting polymer electrolytes as follows. A pair of nickel plates (2×2 $Cm^2$; thickness: 20 $\mu$m) each having 200 $\mu$m thick lithium foil adhered to one side thereof were superposed with their lithium foil sides facing each other, and a 1.0 mm thick film of the polymer electrolyte was inserted therebetween. The cell was repeatedly swept between a lithium electrode potential of −0.5 V and +0.5 V (with respect to an Li electrode) at a scan rate of 10 mV/sec. According as the potential sweep was repeated, the current due to redox reaction of lithium increased, and the resistance of the electrolytic cell as a whole decreased. After 50 cycles of potential sweepings, a voltage of 100 mV was applied to the cell. In Table 9 below are shown the stationary current density on voltage application and the interfacial resistance obtained by the alternating current impedance method.

TABLE 9

| Example No. | Plasticizing Monomer | Current Density (mA/cm$^2$) | Interfacial Resistance ($\Omega$cm$^2$) |
|---|---|---|---|
| 48 | dimethylaminoethyl-benzylmethacrylate chloride*[1] | 12.0 | 136 |
| 49 | diethyleneglycol methacrylate*[2] | 12.5 | 138 |
| 50 | methoxyethylene glycolmethacrylate*[3] | 8.5 | 140 |
| 51 | methoxydiethylene glycolmethacrylate*[4] | 8.5 | 118 |
| 52 | none | 10.5 | 140 |

Note:
*[1]Trade name: Acryl Ester DML60
*[2]Trade name: Acryl Ester PE-90
*[3]Trade name: Acryl Ester PE-100
*[4]Trade name: Acryl Ester PE-200

Table 9 reveals that the current obtained with a given voltage applied becomes higher when MMA and TEGDM are combined with dimethylaminoethylbenzyl methacrylate chloride (Example 48) or diethylene glycol methacrylate (Example 49) as a plasticizing compound than in Example 52 wherein no plasticizing comonomer was used. The higher current in Example 48 is assumed attributed to the positive charge possessed by the quaternized amino group in the side chain of the polymer, which seems to make it easier for $Li^+$ to move due to the electrostatic repulsion. The higher current in Example 49 is considered due to the effects of the hydroxyl groups of the ethylene glycol moiety.

In cases where $LiClO_4$ as an electrolyte was replaced with $LiPF_6$, it was observed that the interfacial resistivity further decreased.

Further, polymer electrolytes were prepared and tested in the same manner as described above, except for using a reaction mixture having the composition shown in Table 10 below. As a result, the interfacial resistivity was not greatly influenced by the change of the electrolyte salt and/or the change of the total monomers to electrolyte solution weight ratio, being stationary or slightly tending to decrease.

TABLE 10

| Polymer Gel Component (molar ratio) | Electrolyte solution (molar ratio) | Polymer Gel Component/Electrolyte solution (weight ratio) | Polymerization Initiator |
|---|---|---|---|
| MMA/TEGDM (Blenmer PDE150 (92.6/7.4) | LiBF$_4$/PC/EC (7/41/52) LiPF$_6$/PC/EC (7/41/52) | 10/90 20/80 10/90 20/80 | AIBN (AIBN/MMA = 0.6/99.4 by mole) |

EXAMPLES 53 TO 56

Polymer electrolytes were prepared from the polymer gel component and the electrolyte solution shown in Table 11 below. A two-electrode cell was assembled in the same manner as in Examples 48 to 52, and an ionic transport number of lithium ion was measured. The terminology "ionic transport number" is a ratio of contribution of specific ions to the total current flowing. The moving velocity (v) and the mobility (u) of ions have the relationship: u=v/F (m$^2$/sV), wherein F is the Faraday constant. It is desired for a polymer electrolyte to have not only a high ionic conductivity but a large lithium ion transport number. The lithium ion transport number (tLi$^+$) was calculated according to equation (a) (see Watanabe et al., *J. Appl. Phys.*, vol. 57, p. 124 (1985)):

$$tLi^+ = Rb/(\Delta V/Is - Re) \quad (a)$$

wherein tLi$^+$ is a transport number of lithium ions; Rb is a bulk resistivity of the polymer electrolyte obtained by the alternating current impedance method; Re is a gel/lithium electrode interfacial resistance obtained by the alternating current impedance method; Is is a stationary current obtained on polarizing at a constant D.C. voltage ($\Delta V<10$ mV).

In this particular testing, "Is" was measured at a potential of 5 mV after 120 minutes. The results obtained are shown in Table 11.

TABLE 11

| Example No. | MMA/TEGDM/Electrolyte solution (molar ratio) | Polymer Gel Component/Elec trolyte solution (weight ratio) | Transport Number of Li$^+$ |
|---|---|---|---|
| 53 | MMA/TEGDM/PC/EC/LiBF$_4$ (9.3/0.7/36.9/46.8/6.3) | 10/90 | 0.29 |
| 54 | MMA/TEGDM/PC/EC/LiPF$_6$ (9.3/0.7/40.5/43.2/6.3) | 10/90 | 0.12 |
| 55 | MMA/TEGDM/PC/EC/LiBF$_4$ (18.5/1.5/32.8/41.6/5.6) | 20/80 | 0.37 |
| 56 | MMA/TEGDM/PC/EC/LiPF$_6$ (18.5/1.5/36.0/38.4/5.6) | 20/80 | 0.56 |

The results in Table 11 show that a high value of the lithium ion transport number can be obtained with the polymer gel electrolyte prepared in Example 56.

EXAMPLE 57

The reaction mixture described below was put in a glass container and allowed to react at 80° C. for 6 hours under a dry argon atmosphere.
Composition of reactive mixture:
(1) Polymer gel component
  Acrylonitrile (AN)
  Dimethylaminoethylmethacrylatemethyl chloride salt (DMC) (trade name: Acryl Ester DMC)
  TEGDM (trade name: Acryl Ester 3ED)
  AN/DMC/TEGDM=91.3/4.9/3.8 by mole
(2) Electrolyte solution
  EC/PC/LiBF$_4$=67/26/7 by mole
  (MMA+DMC+TEGDM)/electrolyte solution=20/80 by weight
(3) Polymerization initiator
  AIBN
  AIBN/(AN+DMC)=1.57/96.2 (by mole)

A lithium secondary battery having the structure shown in FIG. 1 was assembled by using the polymer electrolyte prepared above as an electrolyte layer 13. The negative electrode 12 was a (2 cm by 2cm) metallic lithium plate. The positive electrode 11 (2 cm×2 cm) was prepared by coating a gold plate having a copper thin film with a composition of 2,5-dimercapto-1,3,4-thiadiazole (DMcT)/polyaniline/N-methylpyrrolidone (2/1/10 by weight) to a dry thickness of about 10 μm, followed by vacuum drying at 60° C. for 2 hours.

Figure 22:
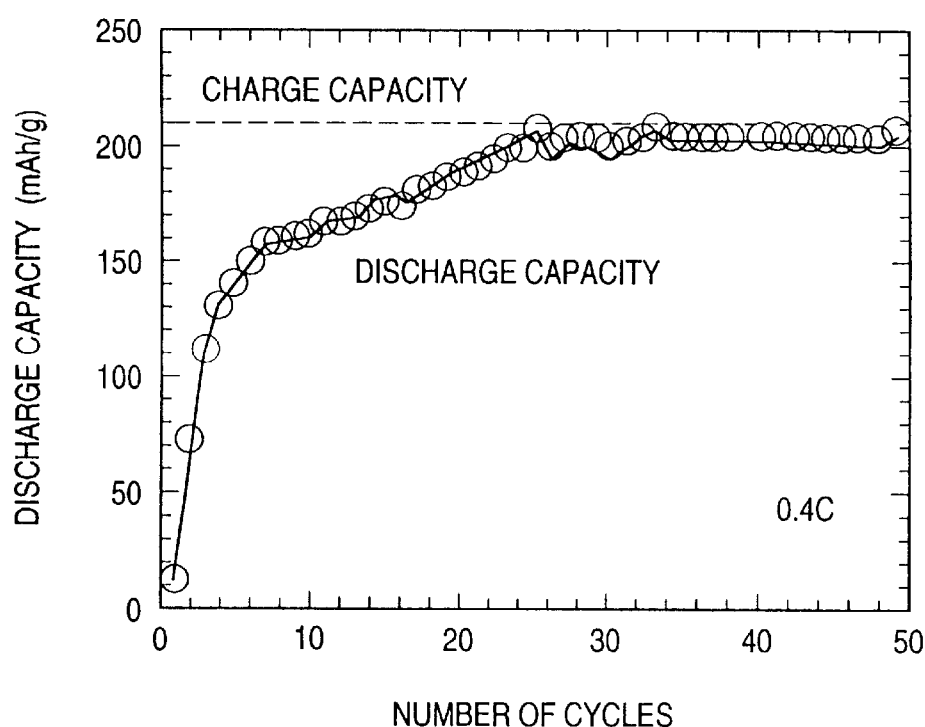
FIG. 22 is a graph showing the relationship between discharge capacity and charge and discharge cycles (0.4 C) in the polymer lithium battery prepared in Example 57.

The resulting lithium secondary battery was subjected to a charge and discharge test at a rate of 0.4 C at 25° C. The charge capacity was set at 80% of that expected from the amount of the active materials. The results obtained are shown in FIG. 22. As is shown, a capacity of 216.8 mAh/g-positive electrode was cycles with almost 100% efficiency during charging and discharging processes after the 24th cycle. While not shown in the graph of FIG. 22, it was confirmed that a charge and discharge cycle can be repeated 500 to 1000 times.

EXAMPLE 58

A polymer electrolyte was prepared in the same manner as in Example 57, except that the electrolyte solution was a 1 mol/l solution of $(C_2H_5)_4NCF_3SO_3$ in γ-butyrolactone (γ-BL) which further contained methanesulfonic acid. A two-electrode cell having the structure shown in FIG. 1 for examining capacitor characteristics was prepared by coating two nickel plates with ruthenium oxide and polyaniline, respectively, each to a thickness of 10 μm, superposing the coated nickel plates with the coated sides facing to each other, and inserting the polymer electrolyte therebetween. The resulting electric capacity was 0.3 F/cm$^2$.

The ionic conductivity of the gel electrolyte used in the above prepared lithium battery was as high as being on the order of 10$^{-3}$ S/cm (at room temperature) as measured by the impedance method in the same manner as described in Examples 41 to 44.

For physical property evaluation, a charge of the test capacity was conducted at a constant current at a rate of 10 C. A 35% charge per monomer unit of polyaniline followed by a discharge gave 99% of a discharge capacity, indicating possibility of high rate charges and discharges.

As can be seen from the above results, excellent capacitor characteristics are obtained from a polymer gel electrolyte prepared from a combination of a solvent having a high dielectric constant and a high boiling point, such as γ-BL (ε: 39; b.p.: 202° C./room temperature), and $(C_2H_5)_4NCF_3SO_3$ having high conductivity at ambient temperature.

EXAMPLE 59

Example 59 demonstrates preparation of a lithium battery or capacitor which is of high safety because the polymer electrolyte material used is flame retardant.

A polymer electrolyte was prepared in the same manner as in Example 27, except for replacing MMA with acrylonitrile (AN), replacing DMC as a plasticizing monomer with dimethylaminoethylmethacrylatebenzyl chloride salt (trade name: DML-60), and replacing the LiBF$_4$ solution as an electrolyte solution with a 1M LiPF$_6$ solution (AN/DML/TEGDM=92.6/3.7/3.7 by mole; (AN+DML+TEGDM)/electrolyte solution=20/80 by weight).

The resulting polymer electrolyte was subjected to a combustibility test in accordance with the method reported by Akashi et al. (*Electrochimical Acta*, vol. 43, 10–11, pp. 1193–1197 (1998)). In this test, the polymer electrolyte was exposed to the flame of a butane gas burner (flame width: about 15 mm; flame length: about 150 mm) placed 25 mm away for 30 seconds. As a result, the polymer electrolyte underwent substantially no change, proving flame retardant.

As described above, the polymer gel of the invention exhibits high affinity for a nonaqueous solvent having an electrolyte dissolved therein and forms a loose complex with lithium ions, which is one of the reasons accounting for the electrolyte solution being hardly released from the polymer matrix. The polymer electrolyte of the invention is suitable for use in lithium secondary batteries because it suppresses lithium dendrite growth.

In particular, the polymer electrolyte containing a plasticizing monomer and a lithium battery or a capacity comprising the same have the following advantages. (1) The battery or capacity can be charged and discharged rapidly over a broad temperature range. (2) The electrolyte layer can be built up to form a multilayer structure having a high voltage output. (3) Suppressing growth of lithium dendrites, the polymer electrolyte permits use of a lithium thin film as a negative electrode. This leads to realization of a battery of high energy density. (4) Being flame retardant, the polymer gel of the invention provides highly safe lithium batteries or capacitors.

While the invention has been described in detail and with reference to specific examples thereof, it will be apparent to one skilled in the art that various changes and modifications can be made therein without departing from the spirit and scope thereof.

What is claimed is:

1. A polymer electrolyte comprising: a polymer gel holding a nonaqueous solvent containing an electrolyte, wherein said polymer gel comprises a polymer containing (I) monomeric units derived from at least one compound having one copolymerizable vinyl group and (II) monomeric units derived from a compound (II-a) represented by one of formulae (1) and (2):

$$H_2C=C(R)COO(CH_2CH_2O)_n-COC(R)=CH_2 \quad (1)$$

wherein n represents an integer 1 to 23; R represents an alkyl group having 1 to 4 carbon atoms, $$H_2C=C(R)COO[(CH_2CH_2O)_p-(CH_2CH(R^1)O)_q(X)_r-(CH_2CH_2O)_p]COC(R)=CH_2 \quad (2)$$

wherein R represents an alkyl group having 1 to 4 carbon atoms; $R_1$ represents a hydrogen atom or a methyl group; X represents a bisphenol; p represents an integer of 16 or smaller; q represents an integer of 34 or smaller; and r represents 1, wherein said monomeric units (I) are derived from at least one compound selected from the group consisting of (meth)acrylonitrile, an (α-alkyl) acrylic acid, an alkyl (α-alkyl)acrylate, a fluoroalkyl(α-alkyl)acrylate, a fluoroalkyl(α-fluoroalkyl)acrylate, a vinyl ester, a vinylalkyl ether, an allylalkyl ether, an allyl ester, vinyl alcohol, vinyl chloride, vinylidene chloride, and a cyclic olefin.

2. The polymer electrolyte according to claim 1, wherein said compound (II-a) has a weight average molecular weight of 5000 or less.

3. The polymer electrolyte according to claim 1, wherein said electrolyte contains at least one lithium salt selected from the group consisting of $CF_3SO_3Li$, $S_4F_9SO_3Li$, $(CF_3SO_2)_2NLi$, $(CF_3SO_2)_3CLi$, $LiBF_4$, $LiPF_6$, $LiClO_4$, and $LiAsF_6$.

4. The polymer electrolyte according to claim 3, wherein said nonaqueous solvent comprises at least one compound selected from the group consisting of a cyclic carbonate, an acyclic carbonate, a cyclic ester, an amide compound, and a nitrile compound.

5. The polymer electrolyte according to claim 1, wherein said electrolyte contains at least one salt selected from the group consisting of $CF_3SO_3Li$, $S_4F_9SO_3Li$, $(CF_3SO_2)_2NLi$, $(CF_3SO_2)_3CLi$, $LiBF_4$, $LiPF_6$, $LiClO_4$, $LiAsF_6$, these salts with the lithium ion displaced with other alkali metals, a tetraalkylammonium salt, a tetraalkylfluoroborate, a tetraalkylphosphonium fluoroborate, a tetraalkylphosphonium trifluorosulfonate, an alkylpyridinium salt, and an N-alkylimidazole salt.

6. The polymer electrolyte according to claim 4, wherein said nonaqueous solvent contains an organic solvent having a donor number of 0.1 or greater and a dielectric constant of 10.0 or greater.

7. The polymer according to claim 6, wherein said organic solvent comprises at least one compound selected from the group consisting of a cyclic carbonate, an acyclic carbonates, a cyclic ester, a nitrile compound, an acid anhydride, an amide compound, a phosphate compound, and an amine compound.

* * * * *